(12) United States Patent
Pavani et al.

(10) Patent No.: US 8,970,671 B2
(45) Date of Patent: Mar. 3, 2015

(54) NONDIFFRACTING BEAM DETECTION DEVICES FOR THREE-DIMENSIONAL IMAGING

(75) Inventors: Sri Rama Prasanna Pavani, Santa Clara, CA (US); Changhuei Yang, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 840 days.

(21) Appl. No.: 13/032,449

(22) Filed: Feb. 22, 2011

(65) Prior Publication Data

US 2011/0205339 A1 Aug. 25, 2011

Related U.S. Application Data

(60) Provisional application No. 61/307,324, filed on Feb. 23, 2010, provisional application No. 61/307,328, filed on Feb. 23, 2010.

(51) Int. Cl.
*H04N 13/02* (2006.01)
*G02B 21/16* (2006.01)
(Continued)

(52) U.S. Cl.
CPC ............ *H04N 13/0207* (2013.01); *G02B 21/16* (2013.01); *G02B 21/361* (2013.01);
(Continued)

(58) Field of Classification Search
USPC ............................................ 348/46, E13.074
See application file for complete search history.

(56) References Cited

U.S. PATENT DOCUMENTS 4,165,464 A 8/1979 Ikeda et al.
4,580,151 A 4/1986 Bamba
(Continued)

FOREIGN PATENT DOCUMENTS

EP 1371965 12/2003
JP 80-015156 1/1996
(Continued)

OTHER PUBLICATIONS (Grosjean et al, 2007) Thierry Grosjean, Said Sadat Saleh, Miguel Angel Suarez, Idriss Abdoulkader Ibrahim, Vincent Piquerey, Daniel Charraut, and Patrick Sandoz, "Fiber microaxicons fabricated by a polishing technique for the generation of Bessel-like beams," Appl. Opt. 46, 8061-8067 (2007).*
(Continued)

*Primary Examiner* — Christopher S Kelley
*Assistant Examiner* — Ana Picon-Feliciano
(74) *Attorney, Agent, or Firm* — Sheila Martinez-Lemke; Weaver Austin Villeneuve & Sampson LLP

(57) ABSTRACT

Embodiments of the present invention relate a nondiffracting beam detection module for generating three-dimensional image data that has a surface layer having a first surface and a light transmissive region, a microaxicon, and a light detector. The microaxicon receives light through the light transmissive region from outside the first surface and generates one or more detection nondiffracting beams based on the received light. The light detector receives the nondiffracting beams and generates three-dimensional image data associated with an object located outside the first surface based on the one or more detection nondiffracting beams received. In some cases, the light detector can localize a three-dimensional position on the object associated with each detection nondiffracting beam received. In other cases, the light detector can determine perspective projections based on the detection nondiffracting beams received and generates the three-dimensional image data, using tomography, based on the determined perspective projections.

27 Claims, 12 Drawing Sheets

(51) Int. Cl.
*G02B 21/36* (2006.01)
*G02B 27/22* (2006.01)
(52) U.S. Cl.
CPC ........ *G02B27/2242* (2013.01); *G02B 27/2285* (2013.01); *H04N 13/0221* (2013.01); *H04N 13/0253* (2013.01)
USPC .................................. 348/46; 348/E13.074

(56) References Cited

U.S. PATENT DOCUMENTS

| | | | |
|---|---|---|---|
| 4,981,362 | A | 1/1991 | DeJong et al. |
| 5,384,573 | A | 1/1995 | Turpin |
| 5,583,342 | A | 12/1996 | Ichie et al. |
| 5,587,832 | A | 12/1996 | Krause |
| 5,795,755 | A | 8/1998 | Lemelson |
| 5,796,112 | A | 8/1998 | Ichie |
| 5,936,764 | A | 8/1999 | Kobayashi |
| 5,973,316 | A | 10/1999 | Ebbesen et al. |
| 6,133,986 | A | 10/2000 | Johnson |
| 6,219,441 | B1 * | 4/2001 | Hu ................ 382/131 |
| 6,248,988 | B1 | 6/2001 | Krantz |
| 6,525,815 | B2 | 2/2003 | Kung et al. |
| 6,628,385 | B1 | 9/2003 | Osipchuk et al. |
| 6,636,300 | B2 | 10/2003 | Doemens et al. |
| 6,646,773 | B2 * | 11/2003 | Garner ............ 359/35 |
| 6,731,391 | B1 | 5/2004 | Kao et al. |
| 6,865,246 | B2 * | 3/2005 | Yang ................ 378/4 |
| 7,045,781 | B2 | 5/2006 | Adamec et al. |
| 7,057,806 | B2 | 6/2006 | Atkinson |
| 7,209,287 | B2 | 4/2007 | Lauer |
| 7,235,777 | B2 | 6/2007 | Hecht |
| 7,250,598 | B2 | 7/2007 | Hollingsworth et al. |
| 7,310,150 | B2 | 12/2007 | Guillermo et al. |
| 7,358,478 | B2 | 4/2008 | Price |
| 7,400,436 | B2 | 7/2008 | Hendriks et al. |
| 7,468,507 | B2 | 12/2008 | Rogers et al. |
| 7,477,380 | B2 | 1/2009 | Knebel et al. |
| 7,567,346 | B2 | 7/2009 | Fomitchov et al. |
| 7,576,862 | B2 | 8/2009 | Cromwell et al. |
| 7,641,856 | B2 | 1/2010 | Padmanabhan et al. |
| 7,642,536 | B2 | 1/2010 | Baer |
| 7,751,048 | B2 | 7/2010 | Yang et al. |
| 7,768,654 | B2 | 8/2010 | Cui et al. |
| 7,773,227 | B2 | 8/2010 | Yang et al. |
| 7,982,883 | B2 | 7/2011 | Cui et al. |
| 8,039,776 | B2 | 10/2011 | Cui et al. |
| 8,189,204 | B2 | 5/2012 | Cui et al. |
| 8,767,216 | B2 | 7/2014 | Yang et al. |
| 8,855,265 | B2 | 10/2014 | Engel et al. |
| 2002/0159047 | A1 | 10/2002 | Dubois |
| 2003/0203502 | A1 | 10/2003 | Zenhausern et al. |
| 2003/0218756 | A1 | 11/2003 | Chen et al. |
| 2005/0162440 | A1 * | 7/2005 | Kleen ............ 345/589 |
| 2005/0190376 | A1 | 9/2005 | Wegmann et al. |
| 2005/0271548 | A1 | 12/2005 | Yang et al. |
| 2005/0286101 | A1 * | 12/2005 | Garner et al. ........ 359/9 |
| 2006/0152780 | A1 | 7/2006 | Klug et al. |
| 2007/0086020 | A1 | 4/2007 | Han et al. |
| 2007/0109619 | A1 | 5/2007 | Eberl et al. |
| 2007/0109633 | A1 * | 5/2007 | Stelzer ............ 359/385 |
| 2007/0207061 | A1 * | 9/2007 | Yang et al. ........ 422/82.05 |
| 2007/0245363 | A1 | 10/2007 | Bakker et al. |
| 2007/0258096 | A1 | 11/2007 | Cui et al. |
| 2007/0277192 | A1 | 11/2007 | Hendriks et al. |
| 2008/0008939 | A1 | 1/2008 | Klug et al. |
| 2008/0049234 | A1 * | 2/2008 | Seitz ............ 356/521 |
| 2008/0100892 | A1 | 5/2008 | Hendriks et al. |
| 2008/0121790 | A1 | 5/2008 | Grier |
| 2008/0212430 | A1 | 9/2008 | Bakker et al. |
| 2009/0218514 | A1 | 9/2009 | Klunder et al. |
| 2009/0218527 | A1 | 9/2009 | French et al. |
| 2009/0225319 | A1 | 9/2009 | Lee et al. |
| 2009/0225411 | A1 | 9/2009 | Cui et al. |
| 2009/0225413 | A1 * | 9/2009 | Stelzer et al. ........ 359/385 |
| 2009/0231689 | A1 | 9/2009 | Pittsyn et al. |
| 2009/0276188 | A1 | 11/2009 | Cui et al. |
| 2010/0059696 | A1 | 3/2010 | Heintzmann et al. |
| 2010/0099984 | A1 * | 4/2010 | Graser ............ 600/425 |
| 2010/0195873 | A1 | 8/2010 | Cui et al. |
| 2010/0309457 | A1 | 12/2010 | Cui et al. |
| 2010/0322494 | A1 * | 12/2010 | Fauver et al. ........ 382/131 |
| 2011/0085219 | A1 | 4/2011 | Yang et al. |
| 2011/0170105 | A1 | 7/2011 | Cui et al. |
| 2011/0181884 | A1 | 7/2011 | Cui et al. |
| 2011/0205352 | A1 | 8/2011 | Pavani et al. |
| 2011/0234757 | A1 | 9/2011 | Zheng et al. |
| 2012/0061554 | A1 | 3/2012 | Cui et al. |
| 2012/0098950 | A1 | 4/2012 | Zheng et al. |
| 2012/0223217 | A1 | 9/2012 | Zheng et al. |
| 2012/0228475 | A1 | 9/2012 | Pang et al. |
| 2012/0267515 | A1 | 10/2012 | Wu et al. |

FOREIGN PATENT DOCUMENTS

| | | |
|---|---|---|
| JP | 2003207454 A | 7/2003 |
| JP | 2003524779 A | 8/2003 |
| KR | 10-2005-006253 | 6/2005 |
| WO | WO-0210713 A2 | 2/2002 |
| WO | WO 2004/038484 | 5/2004 |
| WO | WO-2008107702 A1 | 9/2008 |
| WO | WO 2009/111573 | 9/2009 |
| WO | WO 2010/040570 | 4/2010 |
| WO | WO 2011/035299 | 3/2011 |
| WO | WO 2011/047053 | 4/2011 |
| WO | WO-2011106324 | 9/2011 |
| WO | WO-2011106327 | 9/2011 |
| WO | WO 2012/122398 | 9/2012 |
| WO | WO 2012/145566 | 10/2012 |

OTHER PUBLICATIONS

"Beam Steering Using Liquid Crystals," Boulder Nonlinear Systems, downloaded from the Internet at http://www.bnonlinear.com/papers/LCBeamSteering.pdf, May 8, 2001.
"Talbot Effect," Wikipedia, last modified Dec. 27, 2011.
"Nipkow Disk" Wikipedia, last modified Aug. 13, 2010.
Bates et al, "Multicolor super-resolution imaging with photo-switchable fluorescent probes," Science 317, 1749-1753 (2007).
Besold, G. and Lindlein, "Fractional Talbot effect for periodic microlens arrays", Optics Engineering, vol. 36, pp. 1099-1105 (Apr. 1997).
Betzig, E., et al.,"Imaging intracellular fluorescent proteins at nanometer resolution," Science, vol. 313, pp. 1642-1645 (2006).
Bishara et al., "Lensfree on-chip microscopy over a wide field-of-view using pixel super-resolution," Opt. Expr. 18, pp. 11181-11191 (2010).
Chalut, K. J., et al., "Quantitative phase microscopy with asynchronous digital holography," Optics EXpress, vol. 15, pp. 3047-3052 (2007).
Conchello, Jose-Angel, and Lichtman, Jeff W., "Optical sectioning microscopy," Nature Methods, vol. 2, No. 12, pp. 920-931 (Dec. 2005).
Cui, Xiquan, et al., "Lensless high-resolution on-chip optofluidic microscopes for *Caenorhabditis elegans* and cell imaging," Proceedings of the National Academy of Sciences of the Unities States of America, vol. 105, pp. 10670-10675 (2008).
Di Mambro et al., "Sharpness limitations in the projection of thin lines by use of the Talbot experiment," J. Opt. Soc. Am. A 21, pp. 2276-2282 (2004).
Eah et al., "Nearly diffraction-limited focusing of a fiber aXicon microlens," Rev. Sci. Instrum. 74(11), 4969-4971 (2003).
Frey, H.G., et al.,"High-resolution imaging of single fluorescent molecules with the optical near-field of a metal tip," Phys. Rev. Let. 93, 200801 (2004).
Giloh et al., "Fluorescence microscopy: reduced photobleaching of rhodamine and fluorescein protein conjugates by n-Propyl Gallate," Science 217, pp. 1252-1255 (1982).
Grosjean et al., "Fiber MicroaXicons Fabricated by a Polishing Technique for the Generation of Bessel-Like Beams," Applied Optics 46(33) 8061-8063 (2007).

(56) References Cited

OTHER PUBLICATIONS

Heng, Xin, et al., "An Optical Tweezer Actuated, Nanoaperture-grid based Optofluidic Microscope Implimentation Method," Optics EXpress, vol. 15, No. 25, 16367-75 (2007).
Heng, Xin, et al., "Optofluidic Microscopy—a method for implementing a high resolution optical microscope on a chip," Lab Chip, vol. 6, pp. 1274-1276 (2006).
Ho, J., et al., "Use of whole slide imaging in surgical pathology quality assurance: design and pilot validation studies," Human Pathology 37, pp. 322-331 (2006).
Kimura, Yasuo, et al., "Compact optical head using a holographic optical element for CD players," Appl. Opt. 27, pp. 668-671 (1988).
Lee, Lap Man, et al., "The Application of On-Chip Optofluidic Microscopy for Imaging *Giardia lamblia* Trophozoites and Cysts," Biomed Microdevices, Springer DOI 10.1007/s10544-009-9312-X (2009).
Leger, J.R., et al, "Efficient array illuminator using binary-optics phase plates at fractional-Talbot planes," Optics Letters 15, pp. 288-290 (1990).
Lohmann, A.W. and Silva D.E., "An Interferometer based on the Talbot Effect," Optics Communications, vol. 2, No. 9, pp. 413-415 (Feb. 1971).
Marquet, Pierre, et al., "Digital holographic microscopy: a noninvasive contrast imaging technique allowing quantitative visualization of living cells with subwavelength aXial accuracy," Optics Letters, vol. 30, No. 5, pp. 468-470 (Mar. 2005).
Miao, Qin, et al., "Dual-modal three-dimensional imaging of single cells with isometric high resolution using an optical projection tomography microscope," Journal of Biomedical Optics, vol. 14 (2009).
Merenda, F., et al., "Miniaturized high-NA focusing-mirror multiple optical tweezers," Opt. EXp. 15, 6075-6086 (2007).
Montgomery, W.D., "Self-Imaging Objects of Infinite Aperture," J. Opt. Soc. Am., vol. 57, pp. 772-775 (1967).
Oheim, "High-throughput microscopy must re-invent the microscope rather than speed up its functions," Brit, J. Pharm. 152, op. 1-4 (2007).
Pang, Sean, et al., "Implementation of a color-capable optofluidic microscope on a RGB CMOS color sensor chip substrate," Lab on a Chip, vol. 10, pp. 411-414 (2010).
Patorski, "The self-imaging phenomenon and its applications," Progress in Opt. 27, pp. 3-108 (1989).
Pfeiffer, F., et al., "Hard-X-ray dark-field imaging using a grating interferometer," Nature Materials 7, pp. 134-137 (2008).
Pfeiffer, Franz, et al., "Phase retrieval and differential phase-contrast imaging with low-brilliance X-ray sources," Nat. Phys, vol. 2, pp. 258-261 (published online on Mar. 26, 2006).
Planchon, et al., "Rapid three-dimensional isotropic imaging of living cells using Bessel beam plane illumination," Nat. Methods 8(5) (2011).
Rojo, et al., "Critical comparison of 31 commercially available digital slide systems in pathology," Int'l J. Surg. Path. 14, pp. 285-305 (2006).
Sanchez, E.J., et al., "Near-field fluorescence microscopy based on two-photon eXcitation with metal tips," Phys. Rev. Let. 82, 4014 (1999).
Talbot, "LXXVI. Facts relating to optical science. No. IV," Philosophical Magazine Series 39, pp. 401-407 (1836).
Tao et al., "The generation of an array of nondiffracting beams by a single composite computer generated hologram," J. Opt. A: Pure Appl. Opt. 7, 40-46 (2005).
Titus, Charles M., et al., "Efficient, Accurate Liquid Crystal Digital Light Deflector," Proc. SPIE, vol. 3633(1), pp. 244-253 (Jun. 1999).
Tsien, Roger, et al., "Fluorophores for Confocal Microscopy: Photophysics and Photochemistry," Handbook of Biological Confocal Microscopy, third edition, Springer Science + Business Media, pp. 38-352 (2006).
Turunen, et al., "Holographic generation of diffraction-free beams," Appl. Opt. 27(19), 3959-3962 (1988).

Wu, et al., "Focal Plane tuning in Wide Field-of-view Microscope with Talbot Pattern Illumination," Opt. Lett. 36, 2179-2181 (2011).
Wu, J., et al., "Focus grid generation by in-line holography," Optics Express, vol. 18, p. 14366-14374 (2010).
Wu, J., Cui, X., Lee, L. M., and Yang, C., "The application of Fresnel zone plate based projection in optofluidic microscopy," Opt. Exp. 16, 15595 (2008).
Wu, J., et al., "Wide field-of-view microscope based on holographic focus grid illumination," Optics Letters, vol. 35, No. 13 (2010).
Zapata-Rodriguez, Carlos, et al., "Three-dimensional Field Distribution in the Focal Region of Low-Fresnel-Number AXicons," F. Opt. Soc. Am. A 23(12) 3016-3017 (2005).
Zheng, G.A., et al., "Sub-pixel resolving optofluidic microscope for on-chip cell imaging," Lab on a Chip, vol. 10, pp. 3125-3129 (2010).
Zheng, G., et al., "Supplementary Information for: Sub-pixel resolving optofluidic microscope for on-chip cell imaging," Lap Chip, vol. 10 (2010).
Zhu et al., "Generation of controllable nondiffracting beams using multimode optical fibers," Appl. Phys. Lett. 94, 201102 (2009).
Wu, Jigang, et al., "Focal plane tuning in wide-field-of-view microscope with Talbot pattern illumination," Optics Letters 36 (12), pp. 2179-2181 (2011).
Zheng, Guoan, "The ePetri dish, an on-chip cell imaging platform based on subpixel perspective sweeping microscopy (SPSM)," Proceedings of the National Academy of Science 108 (41), pp. 16889-16894 (2011).
Pang, Shuo, et al., "Fluorescence microscopy imaging with a Fresnel zone plate array based optofluidic microscope," Lab on a Chip 11, 3698-3702, (2011).
International Search Report and Written Opinion in International Application No. PCT/US2011/025751 mailed on Oct. 25, 2011.
International Search Report in International Application No. PCT/US2011/025762 mailed on Oct. 25, 2011.
Written Opinion in International Application No. PCT/US2011/025762 mailed on Oct. 25, 2011.
International Search Report and Written Opinion in International Application No. PCT/US2010/052512 mailed on Apr. 18, 2011.
European Patent Office (EPO) European Supplementary Search Report in EP Application No. 05749488.2 mailed on Jan. 26, 2012.
European Patent Office (EPO) European Supplementary Search Report in EP Patent Application No. 08730664.3 mailed Feb. 7, 2012.
Japanese Patent Office (JPO) Office Action in JPO patent Application No. 2007-515164 (Jul. 26, 2011).
Japanese Patent Office (JPO) Office Action in JPO patent Application No. 2007-515164 (May 8, 2012).
Japanese Patent Office (JPO) Office Action in JPO patent Application No. 2009-553675 (Jan. 24, 2012).
European Patent Office (EPO) Office Action in EP Patent Application No. 05749488.2 mailed on Jun. 27, 2012.
United States Patent and Trademark Office (USPTO) Office Action in U.S. Appl. No. 12/398,050 mailed on Nov. 14, 2011.
United States Patent and Trademark Office (USPTO) Notice of Allowance in U.S. Appl. No. 12/398,050 mailed on Jul. 17, 2012.
United States Patent and Trademark Office (USPTO) Office Action in U.S. Appl. No. 12/398,098 mailed on May 25, 2011.
United States Patent and Trademark Office (USPTO) Restriction Requirement in U.S. Appl. No. 12/399,823 mailed on Aug. 10, 2011.
United States Patent and Trademark Office (USPTO) Non-Final Office Action in U.S. Appl. No. 12/399,823 mailed on Nov. 14, 2011.
United States Patent and Trademark Office (USPTO) Final Office Action in U.S. Appl. No. 12/399,823 mailed on May 25, 2012.
United States Patent and Trademark Office (USPTO) Non-Final Office Action in U.S. Appl. No. 12/903,650 dated on Jan. 14, 2013.
United States Patent and Trademark Office (USPTO) Final Office Action in U.S. Appl. No. 12/903,650 dated on Nov. 7, 2013.
PCT International Preliminary Report on Patentability and Written Opinion dated Apr. 26, 2012 issued in PCT/US2010/052512.
PCT International Preliminary Report on Patentability and Written Opinion dated Sep. 7, 2012 issued in PCT/US2011/025751.
PCT International Preliminary Report on Patentability dated Sep. 7, 2012 issued in PCT/US2011/025762.
PCT International Search Report and Written Opinion dated Sep. 3, 2012 issued in PCT/US2012/028328.

(56) References Cited

OTHER PUBLICATIONS

PCT International Preliminary Report on Patentability and Written Opinion dated Sep. 19, 2013 issued in PCT/US2012/028328.
PCT International Search Report and Written Opinion dated Nov. 28, 2012 issued in PCT/US2012/034339.
PCT International Preliminary Report on Patentability and Written Opinion dated Oct. 31, 2013 issued in PCT/US2012/034339.
Brockie, et al., (Mar. 1, 2001) "Differential Expression of Glutamate Receptor Subunits in the Nervous System of *Caenorhabditis elegans* and Their Regulation by the Homeodomain Protein UNC-42," *The Journal of Neuroscience*, 21(5):1510-1522.
Coskun, A.F., et al., (Sep. 7, 2011) "Wide-field lensless fluorescent microscopy using a tapered fiber-optic faceplate on a chip," *Analyst*, 136(17):3512-3518.
Dubey, et al., (2007) "Wavelength-scanning Talbot effect and its application for arbitrary three-dimensional step-height measurement," *Optics Communications*, 279:13-19.
Garcia-Sucerquia, J. et al., (2006) "Immersion digital in-line holographic microscopy," *Optics Letters*, 31:1211-1213.
Goodman, et al., (2005) "Holography," Chapter 9: pp. 297-393, Introduction to Fourier Optics, 3rd Edition, Roberts & Company Publishers.
Lange, et al., (2005) "A microfluidic shadow imaging system for the study of the nematode *Caenorhabditis elegans* in space," *Sensors and Actuators B*, 107:904-914.
Mudanyali, O., et al., (Jun. 7, 2010) "Compact, light-weight and cost-effective Microscope based on Lensless Incoherent Holography for Telemedicine Applications," *Lab on a Chip*, 10:1417-1428, 25 pp.
Ottevaere, et al., (2006) "Comparing glass and plastic refractive microlenses fabricated with different technologies," *Journal of Optics a-Pure and Applied Optics*, 8(7):S407-S429.
Pang, et al., (Jun. 17, 2013) "Wide Field of View Talbot grid-based microscopy for multicolor fluorescence imaging," *Optic Express*, 21(12):14555-14565.
Repetto L., et al., (2004) "Lensless digital holographic microscope with light-emitting diode illumination," *Opt. Lett.*, 29:1132-1134.
Richard, et al., (2009) "An integrated hybrid interference and absorption filter for fluorescence detection in lab-on-a-chip devices," *Lab on a Chip*, 9:1371:1376.
Seo, et al., (2009) "Lensfree holographic imaging for on-chip cytometry and diagnostics," *Lab on a Chip*, 9:777-787.
Slavich, "Technical specifications of holography materials," downloaded from the Internet at http://www.slavich.com/holo_summary [retrieved on Jun. 12, 2013], 2pp.
Tam, et al., (May 24, 2004) "An imaging fiber-based optical tweezer array for microparticle array assembly," *Appl. Phys. Lett.*, 84(21):4289-4291.
Tsien, Roger, et al., (1998) "The green fluorescent protein," *Annual Review of Biochemistry*, 67:509-544.

Xu, et al., (2001) "Digital in-line holography for biological applications," *PNAS USA*, 98:11301-11305.
United States Patent and Trademark Office (USPTO) Office Action in U.S. Appl. No. 11/125,718 dated on Nov. 14, 2008.
United States Patent and Trademark Office (USPTO) Final Office Action in U.S. Appl. No. 11/125,718 dated on Jul. 1, 2009.
United States Patent and Trademark Office (USPTO) Notice of Allowance in U.S. Appl. No. 11/125,718 dated on Mar. 11, 2010.
United States Patent and Trademark Office (USPTO) Office Action in U.S. Appl. No. 12/797,132 dated on Oct. 15, 2010.
United States Patent and Trademark Office (USPTO) Office Action in U.S. Appl. No. 11/686,095 dated on Jan. 10, 2008.
United States Patent and Trademark Office (USPTO) Office Action in U.S. Appl. No. 11/686,095 dated on Jul. 17, 2008.
United States Patent and Trademark Office (USPTO) Office Action in U.S. Appl. No. 11/686,095 dated on Feb. 26, 2009.
United States Patent and Trademark Office (USPTO) Final Office Action in U.S. Appl. No. 11/686,095 dated on Oct. 28, 2009.
United States Patent and Trademark Office (USPTO) Notice of Allowance in U.S. Appl. No. 11/686,095 dated on Feb. 25, 2010.
United States Patent and Trademark Office (USPTO) Office Action in U.S. Appl. No. 12/785,635 dated on Oct. 15, 2010.
United States Patent and Trademark Office (USPTO) Notice of Allowance in U.S. Appl. No. 12/903,650 dated on Feb. 26, 2014.
United States Patent and Trademark Office (USPTO) Non-Final Office Action in U.S. Appl. No. 13/032,529 dated on Feb. 13, 2014.
United States Patent and Trademark Office (USPTO) Non-Final Office Action in U.S. Appl. No. 13/451,543 dated on Jun. 11, 2014.
United States Patent and Trademark Office (USPTO) Non-Final Office Action in U.S. Appl. No. 12/399,823 dated on May 15, 2014.
Han, (2013) "Wide-Field-of-View On-Chip Talbot Fluorescence Microscopy for Longitudinal Cell Culture Monitoring from within the Incubator," *Analytical Chemistry* 85(4):2356-2360.
Pang et al., (Dec. 1, 2012) "Wide and Scalable Field-of View Talbot-Grid-Based Fluorescence Microscopy," *Optic Letters* 37(23):5018-5020.
United States Patent and Trademark Office (USPTO) Notice of Allowance in U.S. Appl. No. 12/903,650 dated on Apr. 25, 2014.
United States Patent and Trademark Office (USPTO) Final Office Action in U.S. Appl. No. 13/032,529 dated on Sep. 11, 2014.
United States Patent and Trademark Office (USPTO) Notice of Allowance in U.S. Appl. No. 13/451,543 dated on Sep. 30, 2014.
López-Mariscal, Carlos et al., (Jan. 1, 2007) "The generation of nondiffracting beams using inexpensive computer-generated holograms," *Am. J. Phys.*, 75(1):36-42.
United States Patent and Trademark Office (USPTO) Notice of Allowance in U.S. Appl. No. 13/415,657 dated on Nov. 4, 2014.
United States Patent and Trademark Office (USPTO) Final Office Action in U.S. Appl. No. 12/399,823 dated on Nov. 10, 2014.

* cited by examiner

NONDIFFRACTING BEAM DETECTION DEVICES FOR THREE-DIMENSIONAL IMAGING

CROSS-REFERENCES TO RELATED APPLICATIONS

This is a non-provisional application of, and claims priority to, U.S. Provisional Patent Application No. 61/307,324 entitled "Three Dimensional Imaging with Optofluidic Microscopes" filed on Feb. 23, 2010 and U.S. Provisional Patent Application No. 61/307,328 entitled "High-Resolution Microscopy with a Wide Field and Extended Focus" filed on Feb. 23, 2010. These provisional applications are hereby incorporated by reference in their entirety for all purposes.

This non-provisional application is related to the commonly-assigned U.S. patent application Ser. No. 13/032,529 titled "High Resolution Imaging Devices with Wide Field and Extended Focus" filed on Feb. 22, 2011, which is hereby incorporated by reference in its entirety for all purposes.

BACKGROUND OF THE INVENTION

Embodiments of the present invention generally relate to imaging devices. More specifically, certain embodiments relate to nondiffracting beam detection devices for generating high resolution three-dimensional bright field and photoluminescence (e.g., fluorescence or phosphorescence) images.

Optical microscopes have become indispensable tools for modern scientific investigations. They have evolved to appear in different forms and modalities for catering to a wide variety of imaging needs. For example, bright field, dark field, epifluorescence, confocal, two photon, phase contrast, and differential interference contrast (DIC) are now well-known names in biological research labs. In the future, modalities such as stimulated emission and depletion, structured illumination, and photo activated localization are expected to join the list. While these techniques offer improved capabilities, unfortunately, these improvements almost always come with systems that are bulky, complicated, and expensive.

In addition, conventional microscopes can only focus on a single plane at a setting. Typically, a knob is used to move the optics up and down to focus on the plane of interest.

BRIEF SUMMARY OF THE INVENTION

Embodiments of the present invention relate to nondiffracting beam detection devices (NBDs) for three-dimensional imaging used in applications such as microscopy or photography.

One embodiment is directed to an NBD for three-dimensional imaging, comprising a nondiffracting beam detection module (NBDM) and a processor. The NBDM comprises a surface layer having a first surface, a second opposing surface, and a light transmissive region. The NBDM also comprises a microaxicon in the light transmissive region. The microaxicon is configured to receive light through the light transmissive region and generate one or more detection nondiffracting beams based on the received light. The NBDM further comprises a light detector that receives the one or more detection nondiffracting beams and generates three-dimensional image data associated with an object located outside the first surface based on the one or more detection nondiffracting beams received. The processor is in communication with the light detector to receive the three-dimensional image data from the light detector. The processor generates a three-dimensional image of a portion of the object based on the three-dimensional image data received. In some cases, the NBD can also include an illumination source for generating an illuminating nondiffracting beam through the object. In these cases, the light detector can localize a three-dimensional position of one or more point sources on the object, associated with the one or more detection nondiffracting beams received. The processor generates the three-dimensional image using the three-dimensional position of the one or more point sources. In other cases, the NBD can also include an illumination source that provides uniform illumination outside the first surface. In these cases, the light detector also determines one or more perspective projections having different viewing angles. The processor estimates, using tomography, the three-dimensional image of the object from the one or more determined perspective projections.

Another embodiment is directed to an NBDM for generating three-dimensional image data that comprises a surface layer having a first surface and a light transmissive region. The NBDM also comprises a microaxicon that receives light through the light transmissive region from outside the first surface and generate one or more detection nondiffracting beams based on the received light. The NBDM also comprises a light detector that receives the one or more detection nondiffracting beams and generates three-dimensional image data associated with an object located outside the first surface based on the one or more detection nondiffracting beams received.

Another embodiment is directed to an NBD for three-dimensional imaging comprising a body having a surface layer having a first surface, a plurality of NBDMs, and a processor. Each NBDM comprises a light transmissive region in the surface layer, a microaxicon in the light transmissive region, and a light detector. The microaxicon receives light through the light transmissive region and generates one or more detection nondiffracting beams based on the received light. The light detector receives the one or more detection nondiffracting beams and generates three-dimensional image data associated with an object located outside the first surface based on the one or more detection nondiffracting beams received. The processor generates a three-dimensional image of the object based on the three-dimensional image data received from the light detectors of the plurality of nondiffracting beam detection modules.

Another embodiment is directed to an optofluidic NBD for three-dimensional imaging. The optofluidic NBD comprises a body including a fluid channel having a surface layer with a first surface. The optofluidic NBD also comprises an array of light transmissive regions in the surface layer of the body. The array of light transmissive regions extends from a first lateral side to a second lateral side of the fluid channel. The optofluidic NBD also comprises an array of microaxicons in the array of light transmissive regions. Each microaxicon receives light through the associated light transmissive region and generates one or more nondiffracting beams based on the received light. The optofluidic NBD also includes a light detector comprising one or more light detecting elements. The light detector receives the one or more detection nondiffracting beams and generates time varying light data associated with the received one or more detection nondiffracting beams received as an object passes through the fluid channel. The optofluidic NBD also includes a processor configured to generate a three-dimensional image of the object based on the time-varying light data.

These and other embodiments of the invention are described in further detail below.

DETAILED DESCRIPTION OF THE INVENTION

Figure 1:
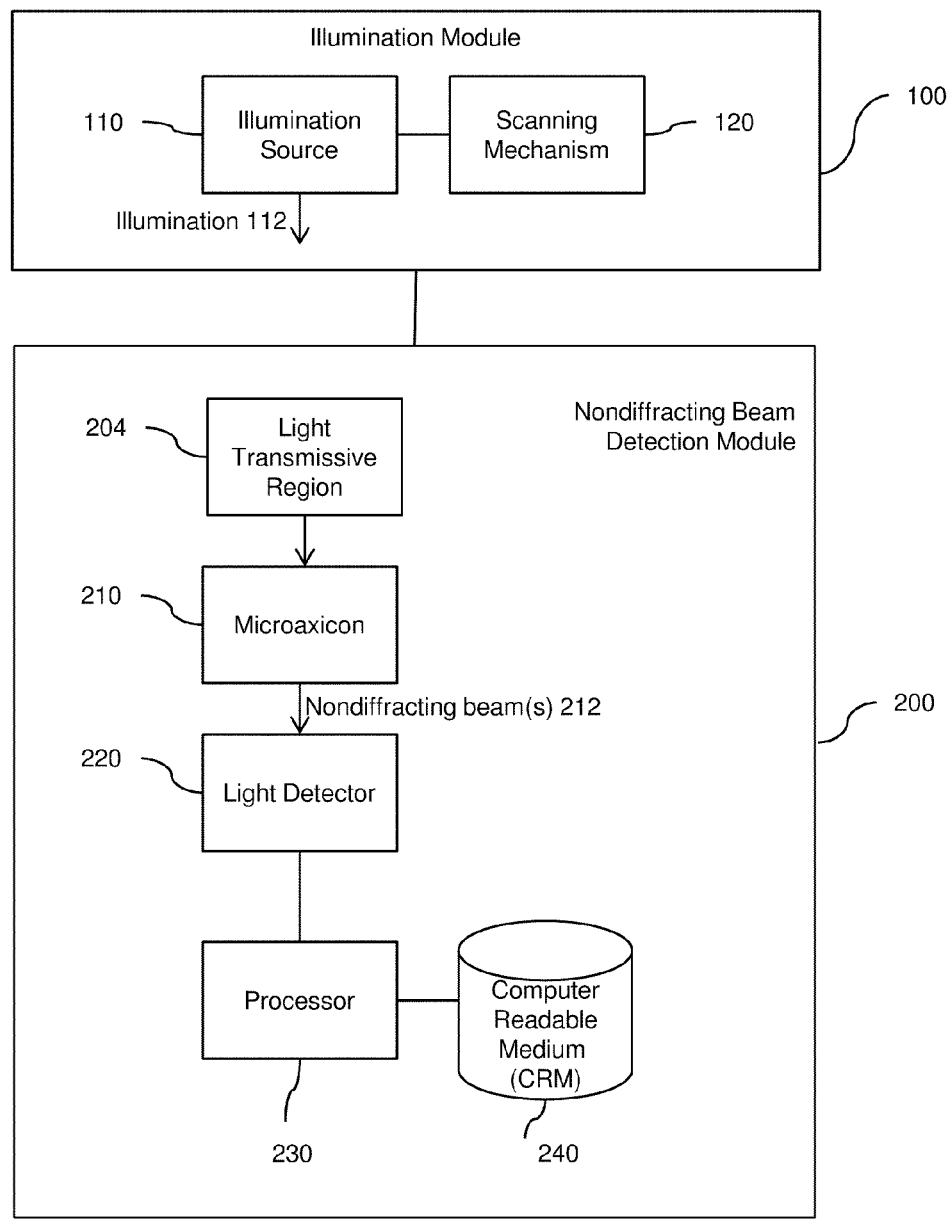
FIG. 1 is a block diagram of components of an NBD for three dimensional imaging comprising an illumination module and a nondiffracting beam detection module, according to embodiments of the invention.

Embodiments of the present invention will be described below with reference to the accompanying drawings. Some embodiments include an NBD for three-dimensional imaging of an object. The NBD includes a multi-layer body having a surface layer with a light transmissive region fitted with a microaxicon. The light transmissive region passes light altered by the object. The microaxicon converts light passing through the light transmissive region into nondiffracting beams (e.g., Bessel beams) propagating at different angles. A light detector measures the point of detection and intensity of each nondiffracting beam associated with an extended depth of field through the object. The NBD can generate a high resolution three-dimensional image of the object based on the measured point of detection and intensity associated with an extended depth of field.

In one approach, the NBD localizes the three-dimensional position and intensity of object point sources (e.g., scattering particles) in an object and uses the information to generate a three-dimensional image of the object. An illumination module generates an illuminating nondiffracting beam providing a narrowly structured illumination path through the object to illuminate object point sources along a beam axis. The microaxicon receives light through the light transmissive region. The microaxicon converts light altered by each object point source into a single detection nondiffracting beam having a single propagation angle. The propagation angle uniquely corresponds to the height of its corresponding object point source. The NBD determines the propagation angle based on the measured point of detection (location of the light detecting element) on the light detector. The NBD can then determine the height of the object point source from the propagation angle determined. The NBD localizes the three-dimensional position of each object point source from the propagation angle and the known location of the illuminating nondiffracting beam. The NBD can then generate three dimensional image data and images based on the three-dimensional position and measured intensity of each object point source.

In another approach, the NBD measures several two-dimensional perspective projections of the object at various narrow viewing angles and uses tomography to combine the perspective projections to estimate a three-dimensional image. Each perspective projection has an extended depth of field at an associated narrow viewing angle. In this approach, uniform illumination is used. The microaxicon receives light through the light transmission region. The microaxicon converts light from different narrow viewing angles into separate detection nondiffracting beams. Each detection nondiffracting beam propagates at a different projection (propagation) angle so that the nondiffracting beams can be directed to different light detecting elements on the light detector. Each light detecting element receives a detection nondiffracting beam with a projection angle associated with a narrow viewing angle (field of view) of the object. That is, each light detecting element uniquely corresponds to a perspective projection of a narrow viewing angle of the object. The NBD generates several perspective projections over various viewing angles using the light data (e.g., intensity data) measured by the light detecting elements in the light detector. The NBD determines the projection angle of each perspective projection from the point of detection of each nondiffracting beam received. Using tomography algorithms, the NBD combines the perspective projections from different projection angles to estimate a three-dimensional image of the object.

Embodiments of the invention provide one or more technical advantages. One advantage is that the NBD can perform three-dimensional imaging with few components in a simple multi-layered arrangement (on-chip application). Since the body is a multilayered structure, the device can be fabricated inexpensively using standard semiconductor and micro/nanofabrication procedures. Also, a multilayered structure can be easily miniaturized. Another advantage is that the NBD includes a scanning mechanism such as a raster scanner or optofluidic flow that allows for three-dimensional imaging at high throughput rates. Another advantage is that multiple NBDs (e.g., 100, 200, etc.) can be combined in parallel since they are relatively compact and simple devices. The multiple NBDs can provide high throughput three-dimensional imaging of large sample volumes.

I. NBD

FIG. 1 is a block diagram of components of an NBD 10 comprising an illumination module 100 and a nondiffracting beam detection module 200 (NBDM), according to embodiments of the invention. Although the illustrated example shows a single NBDM 200 in communication with the illumination module 100, any suitable number of NBDM modules 200 can be in communication with to the illumination module 100.

The illumination module 100 includes an illumination source 110 for providing illumination 112 (light) in a suitable form (e.g., uniform illumination, nondiffracting beam(s), etc.) and a scanning mechanism 120. Illumination 112 from the illumination source 110 is altered (blocked, reduced intensity, modified wavelength/phase, polarization) by an object 130 (shown in FIG. 2), or otherwise remains substantially unaltered with the exception of scattering by particle in the sample.

The scanning mechanism 120 includes any suitable scanning device that can be associated with the illumination source 110, an object 130 (shown in FIG. 2) being imaged, or a specimen stage (e.g., slide) holding an object 130. In the first case, the scanning device (e.g., raster scanner) can be associated with the illumination source 110 such that it is able move the illumination source 110 relative to the object 130 to provide illumination 112 across the object 130. In the second case, the scanning mechanism 120 can be associated with the object 130 such that it is able to move the object 130 being imaged relative to the illumination 112. In this case, the scanning mechanism 120 may be a similar to the scanning mechanism used in optofluidic microscopy, where an image is acquired as an object 130 moves through a fluid channel. An example of a scanning mechanism used in optofluidic microscopy can be found in X. Heng, D. Erickson, L. R. Baugh, Z. Yaqoob, P. W. Sternberg, D. Psaltis, and C. H. Yang, "Optofluidic microscopy—a method for implementing a high resolution optical microscope on a chip," Lab on a Chip 6, 1274-1276 (2006), which is hereby incorporated by reference in its entirety for all purposes. In the third case, the scanning mechanism 120 can be associated with the specimen stage (e.g., slide) holding the object 130 such that it is able to move the object 130 being imaged relative to the illumination 112.

The NBDM 200 includes a light transmissive region 204, a microaxicon 210, a light detector 220, a processor 230 communicatively coupled to the light detector 220, and computer readable medium (CRM) 240 (e.g., memory) communicatively coupled to the processor 230. Although the illustrated example shows the NBDM 200 the processor 230 and computer readable medium (CRM) 240, the processor 230 and CRM 240 may be separate components from the NBDM 200 in other embodiments.

The NBDM 200 is in communication with the illumination module 100 such that it can receive illumination 112 from the illumination source 110 through the light transmissive region 204. The microaxicon 210 receives light from the illumination source 110 through the light transmissive region 204 and converts light received into one or more nondiffracting beams 212 (e.g., Bessel beams) propagating at different angles. The light detector 220 receives the one or more nondiffracting beams 212 and generates signals with light data associated with the received beams 212. The processor 230 is in communication with the light detector 220 such that it can receive signals with light data from the light detector 220. The processor 230 generates three-dimensional image data of the object 130 based on the light data. The processor 230 can also generate a three-dimensional image of the object 130 based on the three-dimensional image data.

An illumination source 110 refers to any device(s) or other source of light (e.g. ambient light) capable of providing illumination 112 in a suitable form and with a suitable wavelength, intensity, polarization, and/or phase. The illumination source 110 and/or scanning mechanism 120 may be components of the NBD 10 or may be separate from the NBD 10. The illumination source 110 may be placed in any suitable location to provide light which can pass through the object 130 and to the microaxicon 210.

Some suitable forms of illumination 112 include uniform illumination and one or more nondiffracting beams. In a photoluminescence (e.g., fluorescence or phosphorescence) embodiment, the illumination source 110 provides excitation light of any suitable light property (e.g., a single wavelength, single polarization, etc.) for exciting fluorophores in the object 130. Some examples of excitation light include fluorescence, two-photon or higher order fluorescence, Raman, second harmonic or higher order, or other emission mechanism that results in emissions at a different wavelength or other light property than the excitation light. The illumination 112 provided by the illumination source 110 may be modulated over time.

The illumination source 110 may include any suitable device or combination of devices. Some suitable illumination sources 110 are naturally and/or commercially available. In some embodiments, the illumination source 110 includes a combination of devices arranged to generate one or more appropriately separated nondiffracting beams (e.g., Bessel beams). Examples of such devices are described in the Nondiffracting Beam Generator Section IA below. In other embodiments, the illumination source 110 includes a source of uniform illumination.

The scanning mechanism 120 may be a component of the NBD 10 or may be separate component from the NBD 10. A scanning mechanism 130 refers to any suitable device(s) or components(s) capable of moving the object 130 or specimen stage (e.g., slide) relative to the illumination 112 or the illumination source 110 relative to the object 130 or specimen stage in order to illuminate at least a portion of the object 130. The scanning mechanism 120 can be based on any suitable method including, for example, microfluidic flow methods, optical tweezing methods, and scanning methods (raster scanning, linear scanning, etc.). An example of a scanning mechanism 120 employing a microfluidic flow method includes a fluid channel 150 (shown in FIG. 6) having a fluid flow with the object 130 being imaged. In another example, the scanning mechanism 120 may include a raster scanning device for moving the object 130 or specimen stage (e.g., slide) with the object 130 relative to the illumination 112 or raster scanning the illumination 112 relative to the object 130. The scanning mechanism 120 can be in any suitable location that does not block the light from the illumination source 110. In some embodiments, the NBD 10 may omit the scanning mechanism 120.

Any suitable object 130 (shown in FIG. 2) or portion of an object 130 may be imaged by the NBD 10. Suitable objects 130 can be biological or inorganic entities. Examples of biological entities include whole cells, cell components, microorganisms such as bacteria or viruses, cell components such as proteins, etc. Inorganic entities may also be imaged by embodiments of the invention.

As used herein, a microaxicon 210 refers to a conical microlens or other suitable lens that can convert light received by the microaxicon 210 into one or more nondiffracting beams. The microaxicon 210 can be of any suitable size and may be in any suitable location in the NBDM 200. Although many embodiments include a microaxicon 210, other nondiffracting beam generators (e.g., a holographic element) can be used to convert light into nondiffracting beam(s) in other embodiments. Suitable nondiffracting beam generators are described in Section IA. In many illustrated embodiments, a microaxicon 210 is used to convert light altered by the object 130 into one or more nondiffracting beams 212 with different propagation angles, which are measured by the light detector 220 at different points of detection. In some illustrated embodiments, the illumination source 110 includes a microaxicon 210 to generate an illuminating nondiffracting beam 112(a) (shown in FIG. 4).

As used herein, a nondiffracting beam, either the illuminating nondiffracting beam 112(a) (shown in FIG. 4 and FIG. 6) or the detection nondiffracting beam 212 (shown in FIGS. 2, 4, 6, 8, 9, 10, and 11), refers to a field of electromagnetic radiation that has little to no diffraction with propagation. For example, as a nondiffracting beam propagates, the beam does not substantially diffract and maintains a tight focus confining photons with a narrow width and sustaining constant width over a relatively long section of the beam's axis. An example of a nondiffracting beam is a Bessel beam.

Figure 3:
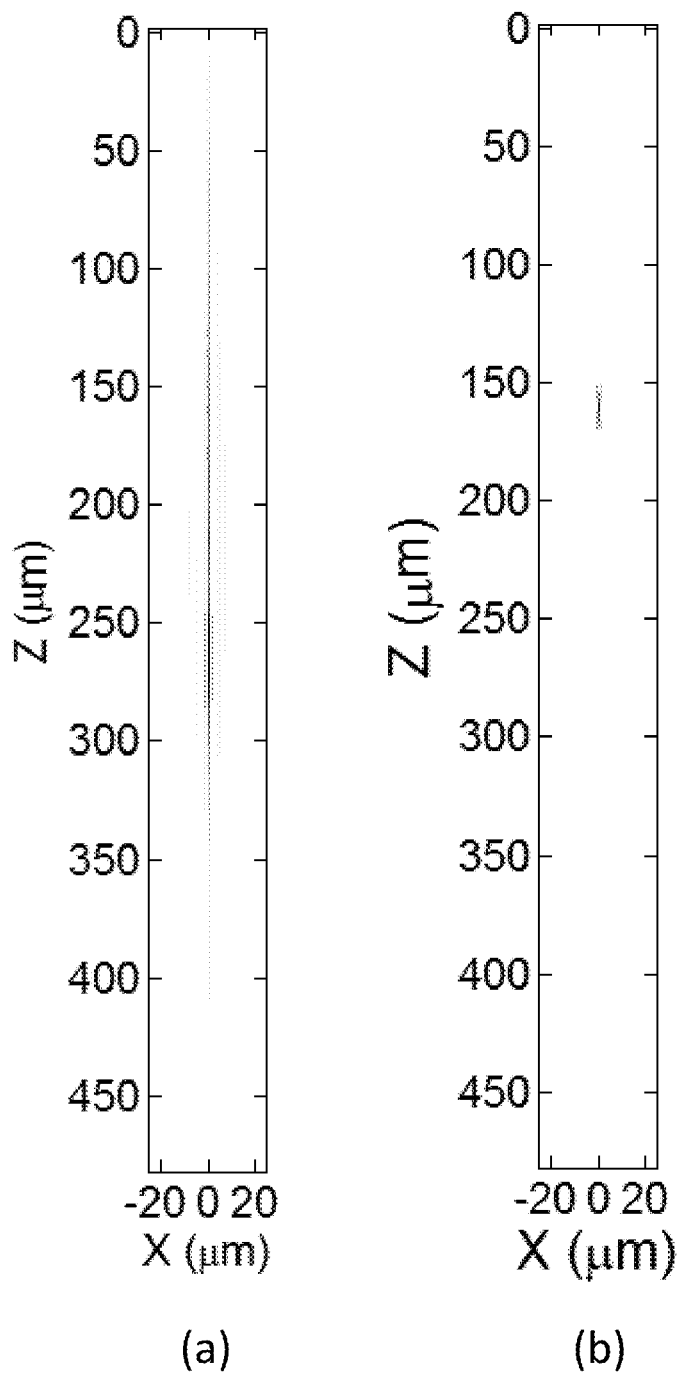
FIG. 3(a) is an intensity graph of a slice in an XZ plane of a Bessel beam, according to embodiments of the invention.
FIG. 3(b) is an intensity graph of a slice in an XZ plane of a focusing spherical wave with 0.3 numerical aperture.

Referring to FIGS. 3(a) and 3(b), the intensity graphs illustrate a side by side comparison of a Bessel beam and a focusing spherical wave with 0.3 numerical aperture. FIG. 3(a) is an intensity graph of a slice in an XZ plane of a Bessel beam and FIG. 3(b) is an intensity graph of a slice in an XZ plane of a focusing spherical wave with 0.3 numerical aperture, according to embodiments of the invention. The Bessel beam in FIG. 3(a) has a narrow width for an extended length (z-distance) whereas the focusing spherical wave in FIG. 3(b) has a relatively short beam length in comparison. That is, the Bessel beam or other nondiffracting beam confines photons within a narrow width through an extended depth of field in comparison with the relatively small depth of field of a the beam of the focusing spherical wave. By comparing beam lengths, FIGS. 3(a) and 3(b) illustrate that a Bessel beam or other nondiffracting beam can provide an extended depth of field relative to the beam of the focusing spherical wave. In addition, the Bessel beam or other nondiffracting beam can propagate with a relatively narrow width for an extended length in comparison with the focusing spherical wave.

Referring back to FIG. 1, the light detector 220 is in communication with the microaxicon 210 to receive one or more nondiffracting beams 212 generated by the microaxicon 210. As used herein, a light detector 220 (e.g., a photosensor) refers to any suitable device capable of generating a signal with light data based on light received by the light detector 220. The signals with light data may be in the form of electrical current from the photoelectric effect. Each light detector 220 includes one or more discrete light detecting elements 220(a) (shown in FIG. 2). In many embodiments, each light detecting element 220(a) (shown in FIG. 2) may receive a nondiffracting beam 212 and can generate a signal with the light data associated with the nondiffracting beam 212 received.

The light detecting elements 220(a) (shown in FIG. 2) can be arranged in any suitable form such as a single light detecting element, a one-dimensional array of light detecting elements 220(a), a two-dimensional array of light detecting elements 220(a), or a multiplicity of one-dimensional and/or two-dimensional arrays of light detecting elements 220(a). The arrays can be in any suitable orientation or combination of orientations. Some examples of light detectors having a single light detecting element 220(a) include a photo-diode (PD), an avalanche photo-diode (APD) and a photomultiplier tubes (PMT). Some examples of light detectors having one-dimensional or two-dimensional arrays include a charge coupled device (CCD) array, a complementary metal-oxide-semiconductor (CMOS) array, an APD array, a PD array, a PMT array, etc. Other suitable light detectors 220 are commercially available. Each light detecting element 220(a) may be of any suitable size (e.g., 1-10 microns) and any suitable shape (e.g., circular or square). For example, a complementary metal-oxide-semiconductor (CMOS) or charge coupled device (CCD) light detecting element 220(a) may be 1-10 microns and an APD or PMT light detecting element 220(a) may be as large as 1-4 mm.

Figure 2:
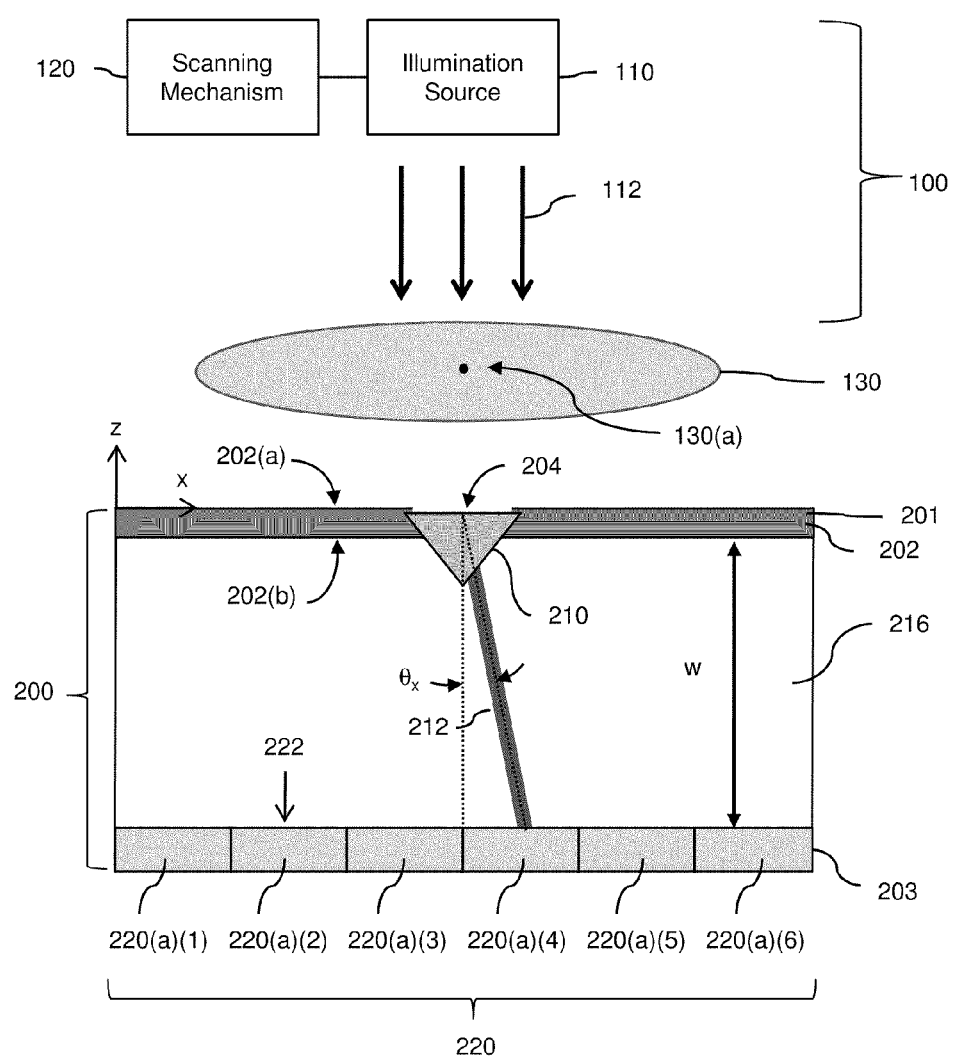
FIG. 2 is a schematic drawing of a cross-sectional view of components of an NBD for three-dimensional imaging, according to embodiments of the invention.

Each light detecting element 220(a) can generate a signal with light data based on light received. As used herein, light data refers to any suitable information related to the light received by the light detecting element 220(a). Light data may include, for example, information about the properties of the light detected such as the intensity of the light, the wavelength(s) of the light, the frequency or frequencies of the light, the polarization(s) of the light, the phase(s) of the light, the spin angular momentum(s) of the light, and/or other light properties associated with the light detected by the light detecting elements 220(a) (as shown in FIG. 2) of the light detector 220. Light data may also include the location of the light detecting elements 220(a) (shown in FIG. 2) associated with the light data and the time that the light was detected by the light detecting elements 220(a). Light data may be data based on a single time, based on multiple times, or based on a time varying basis. In some embodiments such as the microfluidic flow embodiments, the light data may be time varying light data.

Light data from a light detecting element 220(a) may include data associated with a point of detection. The point of detection refers to the location on the light detector plane 222 (shown in FIG. 2) of the light detector 220 that receives the detection nondiffracting beam 212. In some cases, the point of detection may be estimated as the center or other specific location of the light detecting element 220(a) receiving detection nondiffracting beam 212.

The processor 230 (e.g., microprocessor) receives signals with light data from the light detector 220 associated with the light received by the light detecting elements 220(a). The processor 230 can generate three-dimensional image data based on light data received from the light detector 220. As used herein, three-dimensional image data refers to any suitable data that can be used to generate a three-dimensional image. Some suitable data includes the three-dimensional position of the object point source 130(a) (shown in FIG. 4) a propagation angle of the detection nondiffracting beam 212 (shown in FIG. 4), perspective projections (two-dimensional images), etc.

The processor 230 executes code stored on the CRM 240 to perform some of the functions of NBD 10 such as interpreting the light data from the light detector 220, performing analyses of the light data, generating three-dimensional image data from the light data, and/or generating one or more three-dimensional images of the object 130.

The CRM (e.g., memory) 240 stores code for performing some functions of the NBD 10. The code is executable by the processor 230. In embodiments, the CRM 240 may comprise: a) code for interpreting light data received from the light detector 220, b) code for generating three-dimensional image data of the object 130 based on light data, c) code for determining the propagation angle of a detection nondiffracting beam 212, d) code for generating two-dimensional perspective projections of the object 130 based on light data, e) code for determining the three-dimensional position of an object point source 130(a) (shown in FIG. 4) (e.g., scatterer) based on light data, f) code for generating a three-dimensional image of the object 130 based on the three-dimensional image data, g) code for displaying the three-dimensional images, h) and/or any other suitable code for performing functions of the NBD 10. The CRM 240 may also include code for performing any of the signal processing or other software-related functions that may be created by those of ordinary skill in the art. The code may be in any suitable programming language including C, C++, Pascal, etc.

Modifications, additions, or omissions may be made to NBD 10 without departing from the scope of the disclosure. For example, other embodiments of the NBD 10 may include a display 230 communicatively coupled to the processor 230 to receive output data such as a three-dimensional image data and provide output such as a three-dimensional image or three-dimensional image data to a user of the NBD 10. In addition, the components of NBD 10 may be integrated or separated according to particular needs. For example, the processor 230 or other suitable processor may be integrated into the light detector 220 so that the light detector 220 performs one or more of the functions of the processor 230 in some embodiments. As another example, the processor 230 and CRM 240 may be components of a computer separate from the NBDM 200 and in communication with the NBDM 200.

FIG. 2 is a schematic drawing of a cross-sectional view of components of an NBD 10, according to embodiments of the invention. The NBD 10 comprises an illumination module 100, an NBDM 200, and an object 130 being imaged by the NBD 10. The illumination module 100 generates illumination 112 to illuminate the object 130. The NBDM 200 generates three-dimensional image data of the object 130 and/or a three-dimensional image of the object 130 based on the illumination 112. Although a single NBDM module 200 and single NBDM module 200 are shown, any suitable number of modules may be included in the NBD 10 in other embodiments.

The illumination module 100 includes an illumination source 110 providing illumination 112 in any suitable form (e.g., uniform illumination, nondiffracting beam(s), etc.) and having any suitable wavelength, phase, polarization, and intensity. Some suitable forms include uniform illumination and one or more nondiffracting beams. In a photoluminescence (e.g., fluorescence or phosphorescence) embodiment, the illumination source 110 provides excitation light of any suitable light property (e.g., a single wavelength, single polarization, etc.) for exciting fluorophores in the object 130. Some examples include a fluorescence, two-photon or higher order fluorescence, Raman, second harmonic or higher order, or other emission mechanism that results in emissions at a different wavelength or other light property than the excitation light. The illumination source 110 may be placed in any suitable location to provide light which can pass through the object 130 and to the microaxicon 210. The illumination 112 provided by the illumination source 110 may be modulated over time. Some suitable illumination sources 110 are naturally and/or commercially available.

The illumination source 110 may include any suitable device or combination of devices. In some embodiments, the illumination source 110 includes a combination of devices arranged to generate one or more appropriately separated nondiffracting beams (e.g., Bessel beams). Examples of such devices are described in the Nondiffracting Beam Generator Section IA below. In other embodiments, the illumination source 110 includes a source of uniform illumination.

The illumination module 100 also includes a scanning mechanism 120 associated with the illumination source 110 such that it is able to move the illumination source 110 relative to the object 130 to provide illumination 112 across the object 130 or a portion of the object 130. In other embodiments, the scanning mechanism 120 may be associated with the object 130 or specimen stage (e.g., slide) holding the object 130 such that it is able the object 130 relative to the illumination source 110. The scanning mechanism 120 can be based on any suitable method such as microfluidic flow, optical tweezing, scanning (raster scanning, linear scanning, etc.). An example of a scanning mechanism 120 employing a microfluidic flow method includes a fluid channel 150 (shown in FIG. 6) having a fluid flow with the object 130 being imaged. In another example, the scanning mechanism 120 may include a raster scanning device for moving the object 130 or specimen stage (e.g., slide) with the object 130 relative to the illumination 112 or scanning the illumination 112 relative to the object 130. The scanning mechanism 120 can be in any suitable location that does not block the light from the illumination source 110. In some embodiments, the NBD 10 may omit the scanning mechanism 120.

Any suitable object 130 (shown in FIG. 2) or portion of an object 130 may be imaged by the NBD 10. Suitable objects 130 can be biological or inorganic entities. Examples of biological entities include whole cells, cell components, microorganisms such as bacteria or viruses, cell components such as proteins, etc. Inorganic entities may also be imaged by embodiments of the invention. Examples of inorganic entities include mineral fibers, and crystals.

The object 130 includes one or more object point sources 130(a) in the volume of the object 130. As used herein, an object point source 130(a) refers to a scatterer/fluorophore in the object 130 that can alter (e.g., scatter and/or absorb and re-emit) light of the illuminating nondiffracting beam 112(a). Each object point source 130(a) has a three-dimensional position (X, Y, and Z position).

The NBD 10 includes a body 201. In some embodiments, the body 201 may be a single, monolithic structure. In other embodiments, the body 201 may be a multi-layer structure. The layers of a multi-layer body may be of any suitable material or combination of materials having any suitable thickness or thicknesses. The layers of the multi-layer body may also include any suitable devices (e.g., light detector 220).

In the embodiment shown in FIG. 2, the body 201 is a multi-layer structure including a surface layer 202 with a first surface 202(a) and a second surface 202(b), a light detector layer 203 having a light detector 220 with six light detecting elements 220(a)(1)-220(a)(6), and a separation layer 216 between the light detector layer 203 and the surface layer 202. The surface layer 202 may be a thin metallic layer in some cases. The separation layer 216 may be made of a transparent material, or a void. The separation layer 216 has a thickness, w. Any suitable thickness can be used. In some cases, the thickness of the separation layer 216 may be designed to maximize the efficiency of the NBD 10. The body 201 may optionally include a transparent protective layer (not shown) outside the first surface 202(a) to isolate the surface layer 202. Although FIG. 2 has certain layers, other embodiments may integrate, omit, or add one or more layers or change the location of one or more layers in the body 201. As another example, the multi-layer body 201 may optionally include a filter layer 214 (shown in FIG. 6).

The multi-layer body 201 may be fabricated using standard semiconductor and micro/nanofabrication procedures. During an exemplary assembly of the multi-layer body 201, the separation layer 216 can be placed on top of the light detector 220. Then, the surface layer 202 with the light transmissive region 204 fitted with the microaxicon 210 can be placed on top of the separation layer 216.

Figure 6:
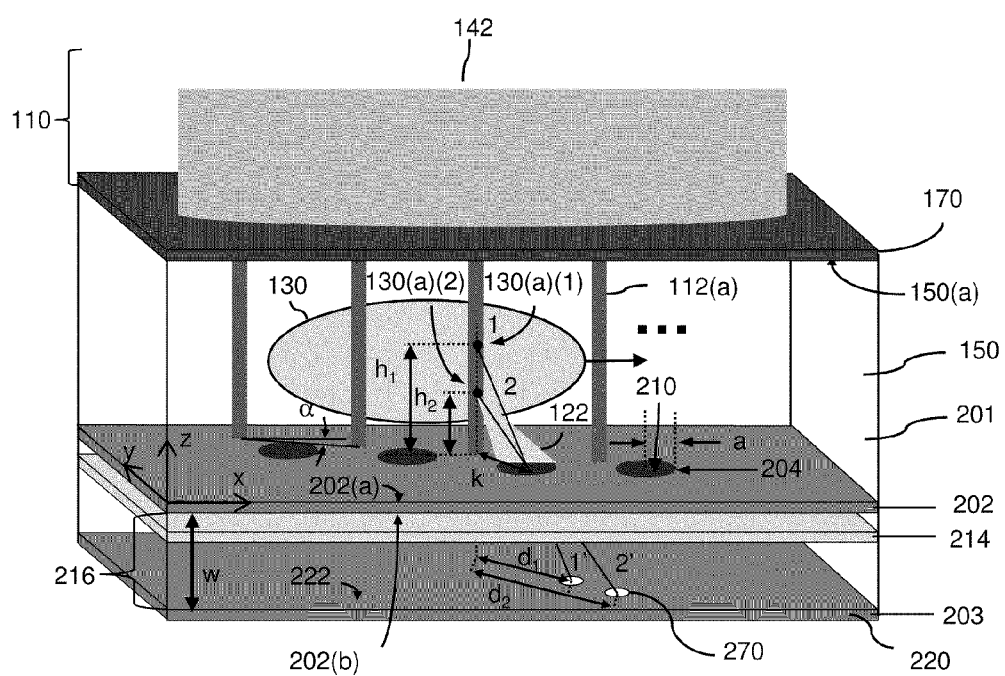
FIG. 6 is a schematic drawing of components of a nondiffracting beam detecting device for three-dimensional imaging using optofluidic flow with the three-dimensional position localization approach, according to embodiments of the invention.

In some embodiments, the illumination module 100 and/or NBDM 200 may include one or more layers of the body 201. As shown in FIG. 2, for example, the NBDM 200 includes the surface layer 202, the light detector layer 203, and the separation layer 216. As another example, as shown in FIG. 6, a body 201 includes the holographic element 170 of the illumination module 100.

The surface layer 202 also includes a light transmissive region 204. The light transmissive region 204 may be of any suitable size (e.g., 0.1 μm, 0.5 μm, 1 μm, 5 μm, etc.) and have any suitable cross sectional shape (e.g., circular, rectangular, oval, etc.). In many cases, the light transmissive region 204 is a hole or a slit. In some of these cases, the holes/slits may be at least partially filled with a transparent material.

The surface layer 202 also includes a microaxicon 210 that is fitted within the light transmissive region 204 to receive light passing through the light transmissive region 204. Although some illustrated embodiments of the NBD 10 include a microaxicon 210 that is located in the light transmissive region 204, other embodiments may include a microaxicon 210 that is partially located in the light transmissive region 204 or located outside of the light transmissive region 204 in a location that can receive light passing through the light transmissive region 204. In FIG. 2, microaxicon 210 receives light, which may be altered by the object 130, through the light transmissive region 204 and converts the light received into a detection nondiffracting beam 212 at a propagation angle, $e_x$. Although a single detection nondiffracting beam 212 is shown, two or more detection nondiffracting beams 212 may be generated by the microaxicon 210 in other embodiments. Although a single light transmissive region 204 with a single microaxicon 210 is shown in the illustrated embodiment, any suitable number of light transmissive regions 204 and microaxicons 210 may be used in other embodiments.

The NBD 10 also includes an x-axis, a y-axis (not shown), and a z-axis. The x-axis and y-axis lie in the plane of the first surface 202(a) of the surface layer 202. The z-axis is orthogonal to this plane.

In FIG. 2, the light detector 220 includes six light detecting elements 220(a)(1), 220(a)(2), 220(a)(3), 220(a)(4), 220(a)(5), and 220(a)(6) arranged in the X direction. In other embodiments, the light detector 220 may further include light detecting elements 220(a) in the Y direction. In the illustrated example, the fourth light detecting element 220(a)(4) receives the detection nondiffracting beam 212 and can generate a signal with light data associated with the nondiffracting beam 212 received. In other embodiments, the microaxicon 210 may generate two or more detection nondiffracting beams 212, which are received by two or more light detecting elements 220(a).

Light data may include, for example, information about the properties of the light detected such as the intensity of the light, the wavelength(s) of the light, the frequency or frequencies of the light, the polarization(s) of the light, the phase(s) of the light, the spin angular momentum(s) of the light, and/or other light properties associated with the light detected by the light detecting elements 220(a) of the light detector 220. Light data may also include the location of the light detecting elements 220(a) associated with the light data and the time that the light was detected by the light detecting elements 220(a). Light data may be data based on a single time, based on multiple times, or based on a time varying basis. In some embodiments such as the microfluidic flow embodiments, the light data may be time varying light data.

Figure 4:
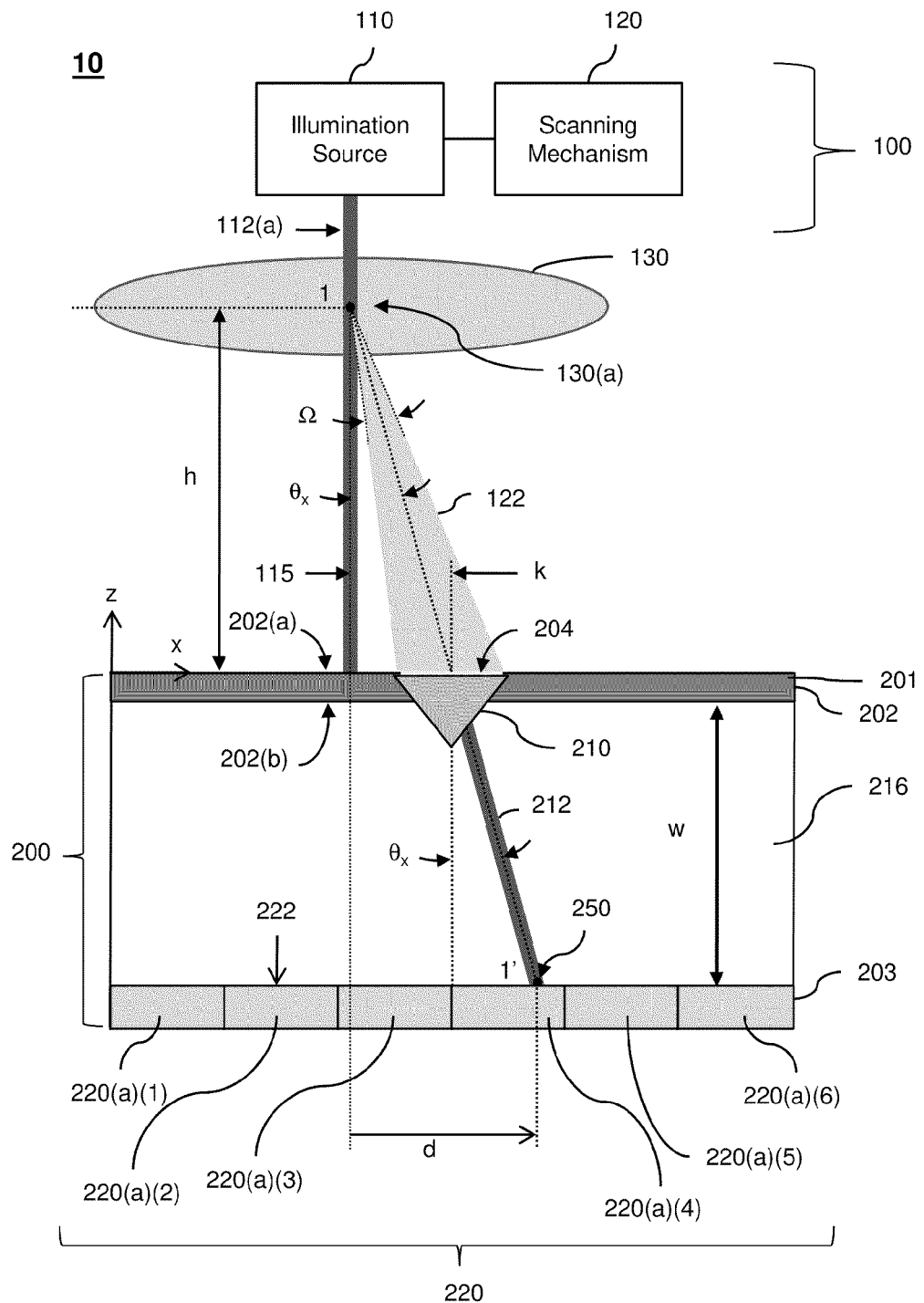
FIG. 4 is a schematic drawing of a cross-sectional view of components of a nondiffracting beam detecting device for three-dimensional imaging that can use the first approach to generate three dimensional image data, according to embodiments of the invention.

Light data from a light detecting element 220(a) may include the three-dimensional position of the point of detection 250 (shown in FIG. 4). The point of detection refers to the location on the light detector plane 222 of the light detector 220 that receives the detection nondiffracting beam 212. In some cases, the point of detection may be estimated as the center or other specific location of the light detecting element 220(a) receiving detection nondiffracting beam 212.

The NBDM 200 can generate three-dimensional image data based on the light data. Some suitable three-dimensional data includes the three-dimensional position of the object point source 130(a) (shown in FIG. 4), the propagation angle of the detection nondiffracting beam 212 (shown in FIG. 4), perspective projections (two-dimensional images), etc.

Although not shown in FIG. 2, the NBD 10 also includes a processor 230 (shown in FIG. 1) communicatively coupled to the light detector 220 and a CRM 240 in communication with the processor 230. The processor 230 executes code stored on the CRM 240 to perform some of the functions of NBD 10. For example, the processor 230 may receive a signal with the light data from the light detector 220 and generate three-dimensional image data of the object 130 based on the light data. The processor 230 may also generate one or more three-dimensional images of the object 130 or portions of the object 130 based on the three-dimensional image data.

In operation, the illumination source 110 and scanning mechanism 120 provide illumination 112 across the object 130. Light from the illumination source 110 is altered (blocked, reduced intensity, modified wavelength/phase, etc.) by the object 130, or otherwise remains substantially unaltered with the exception of scattering by other particles. The microaxicon 210 receives light passing through the light transmissive region 204. The microaxicon 210 generates one or more nondiffracting beams 212. Each beam propagates at a different propagation angle. The light detector 220 receives the one or more nondiffracting beams 212 and generates a signal with light data associated with the one or more beams 212 received. The processor 230 receives the signal with the light data and generates three-dimensional data of the object 130 based on the light data. The processor 230 also generates a three-dimensional image of the object 130 based on the three-dimensional image data.

In one embodiment, the NBD 10 can generate three-dimensional photoluminescence (e.g., fluorescence or phosphorescence) images of the object 130. In this embodiment, the body 201 includes an additional filter layer 214 between the object 130 and the light detector 220. Typically, the filter layer 214 is sandwiched within the separation layer 216 (as shown in FIG. 6) at either the second surface 202(a) or the light detector plane 222. Other locations would be readily apparent to one skilled in the art. The filter layer 214 includes any suitable device(s) (e.g., optical filter) that can reject the excitation light and pass emission light from the fluorophores. In this embodiment, the illumination source 110 (e.g., laser) provides an excitation light having an excitation wavelength that can excite fluorophores in the object 130. The excited fluorophores can emit an emission light. The light data would be associated with the emission light from the fluorophores in the object 130. The processor 230 generates three-dimensional image data associated with the emission light data and generates three-dimensional photoluminescence images of the object 130 based on the three-dimensional image data.

In some embodiments, the NBD 10 may omit the scanning mechanism 120. In one embodiment, for example, the NBD 10 may include an illumination source 110 that provides uniform illumination across the object 130 without the need for a scanning mechanism 120. In another embodiment, the NBD 10 may include an illumination source 110 having a nondiffracting beam generator as described in Section 1A that generates a two-dimensional array of illuminating nondiffracting beams 212 (shown in FIG. 2) of a suitable size to span the object 130 and having a suitable array dimension (e.g., 500×1000, 2000×2000, 10000×10000, etc.). In this embodiment, the NBD 10 can illuminate the object 130 with the array of nondiffracting beams 212 and a scanning mechanism 120 may not be required. The NBD 10 can take a snapshot three-dimensional image of the object 130 using light data measured at a single time.

Modifications, additions, or omissions may be made to NBD 10 without departing from the scope of the disclosure. For example, other embodiments of the NBD 10 may omit the scanning mechanism 120. In one such embodiment, the NBD 10 provides uniform illumination across the object 130 without the need for a scanning mechanism 120. In another such embodiment, the NBD 10 includes an illumination source 110 generates a two-dimensional array of nondiffracting beams 212 of a suitable size to span across the object 130. The two-dimensional array may have any suitable dimension (e.g., 500×1000, 2000×2000, 10000×10000, etc.). In this embodiment, the NBD 10 may take a snapshot image of the object 130 at a single time. As another example, other embodiments may include a display, a processor 230 and/or a CRM 240. In addition, the components of NBD 10 may be integrated or separated according to particular needs.

A. Nondiffracting Beam Generators (e.g., Bessel Beam Generators)

A nondiffracting beam generator refers to any suitable device or combination of devices that generates one or more nondiffracting beams (e.g., illuminating nondiffracting beams 112(a) in the illumination module 100 or detection nondiffracting beams 212 in the NBDM 200). Some examples of suitable nondiffracting beam generators include: 1) a computer generated hologram (CGH) or other holographic element 170 coupled to an excitation beam source, 2) a microaxicon, and 3) an optical fiber.

A nondiffracting beam generator including a CGH or other holographic element 170 (shown in FIG. 6) coupled to an excitation beam source for providing an excitation beam 142 is the preferred device for generating one or more illuminating nondiffracting beams 112(a) in the illumination module 100 of many embodiments. In some cases, a CGH can be designed so that adjacent illuminating nondiffracting beams 112(a) are sufficiently separated to avoid crosstalk/multiplexing between beams, which can affect the quality of the nondiffracting beam illumination. An example of a nondiffracting beam generator comprising a CGH can be found in "The generation of an array of nondiffracting beams by a single composite computer generated hologram," S H Tao et al 2005 J. Opt. A: Pure Appl. Opt. 7 40, which is hereby incorporated by reference in its entirety for all purposes. In this example, a CGH includes an N×N array of holograms, each hologram generating an individual Bessel beam. The CGH in this example can be used to generate a two-dimensional (N×N) array of Bessel beams. In this example, the holograms are designed to generate Bessel beams with sufficient separation to avoid crosstalk. Another example of a nondiffracting beam generator including a CGH can be found in "Holographic generation of diffraction-free beams, Jari Turunen, Antti Vasara, and Ari T. Friberg, Appl. Opt. 27, 3959-3962 (1988)," S H Tao et al 2005 J. Opt. A: Pure Appl. Opt. 7 40, which is hereby incorporated by reference in its entirety for all purposes.

In some embodiments, such as the embodiment illustrated in FIG. 6, the illumination module 100 includes an illumination source 110 including a custom designed holographic element 170 (e.g., custom designed CGH). The illumination source 110 also includes an excitation beam source providing an excitation beam 142 (e.g., plane wave excitation beam). The holographic element 170 produces one or more illuminating nondiffracting beam 112(a) (e.g., Bessel beams), upon being illuminated by the excitation beam 142. In FIG. 6, the holographic element 170 produces an array of illuminating nondiffracting beams 112(a) that are separated to reduce or prevent crosstalk. The custom designed holographic element (e.g., custom designed CGH) is custom designed to generate one or more illuminating nondiffracting beams 112(a) that do not diffract or only minimally diffracts within a limited region of space. The holographic element 170 is computationally designed by interfering a conical wave front with a plane wave. The spot size and the focal plane of each illuminating nondiffracting beam 112(a) are controlled by adjusting the width and the peak phase retardation of the conical wave front. Depending on resolution requirements, the custom designed holographic element 170 can either be printed with grayscale graphics printers, with photoplotters as halftone images, or can be fabricated as chrome/iron oxide binary photomasks. Some examples of a suitable custom-designed CGHs can be found in "Holographic generation of diffraction-free beams," Jari Turunen, Antti Vasara, and Ari T. Friberg, Appl. Opt. 27, 3959-3962 (1988) and "The generation of an array of nondiffracting beams by a single composite computer generated hologram," S H Tao et al 2005 J. Opt. A: Pure Appl. Opt. 7 40.

In FIG. 6, the holographic element 170 can be made of any suitable materials. Some examples of suitable holographic materials include photographic emulsions, dichromated gelatin, and photoresists. The holographic element 170 can have any suitable dimensions (e.g., 1 mm×1 mm, 2 mm×2 mm, 5 mm×2 mm, 10 mm×10 mm, 10 mm×50 mm, etc.). The holographic element 170 can be made using any holographic recording technique capable of encoding (recording) data about the focal array of light spots. Some examples of suitable holographic recording techniques include in-line (Gabor) and off-axis (Leith-Upatnieks). To play back the recording, the holographic element 170 can be illuminated by the plane wave excitation beam 142 having the same wavelength, same spatial distribution, but not necessarily the same intensity, as the reference beam used to record the holographic element 170.

A nondiffracting beam generator including a microaxicon 210 is the preferred device for generating one or more nondiffracting beams 212 in the detection module 200 of many embodiments. An example of a nondiffracting beam generator comprising optical fibers having axicon microlens can be found in "Nearly diffraction-limited focusing of a fiber axicon microlens," Sang-Kee Eah, Wonho Jhe, and Yasuhiko Arakawa, Rev. Sci. Instrum. 74, 4969 (2003), which is hereby incorporated by reference in its entirety for all purposes. In this example, the nondiffracting beam generator includes commercially available single-mode optical fibers. In this example, a microaxicon is fabricated in the end of each optical fiber by selective chemical etching method that allows fine control of the cone angle of the fiber. Light passing through each optical fiber passes through the microaxicon generating a nondiffracting beam and nearly diffraction-limited focused spot.

A nondiffracting beam generator including a multimode optical fiber is another device that can be used to generate one or more nondiffracting beams. An example of a nondiffracting beam generator comprising a multimode optical fiber device can be found in "Generation of controllable nondiffracting beams using multimode optical fibers," Appl. Phys. Lett. 94, 201102 (2009), which is hereby incorporated by reference in its entirety for all purposes. In this example, the multimode optical fiber device includes a laser coupled to a single mode fiber which is coupled to a multimode fiber generating a nondiffracting beam.

In addition, embodiments of the NBD 10 include a microaxicon 210 (shown in FIG. 2) for converting light collected by the microaxicon 210 into one or more nondiffracting beams 212 for measurement by the light detector 220. An example of a suitable microaxicon 210 that can generate one or more nondiffracting beams 212 can be found in "Nearly diffraction-limited focusing of a fiber axicon microlens," Sang-Kee Eah, Wonho Jhe, and Yasuhiko Arakawa, Rev. Sci. Instrum. 74, 4969 (2003).

II. Approaches to Generating Three-Dimensional Image Data

The NBD 10 may use different approaches to generate three-dimensional image data and three-dimensional images. Two different approaches are described below. A first approach uses the NBDM 200 in combination with illuminating nondiffracting beams 112(*a*) (shown in FIG. 4) to localize the three dimensional position and brightness of object point sources in the object. The three dimensional position and brightness of object point sources can be used to generate a three-dimensional image of the object. In contrast, a second approach uses the NBDM 200 together with uniform illumination to measure several perspective projections of the object 130 taken at various angles. The perspective projections are combined, using tomography, to form a three-dimensional image data and a three dimensional image of the object 130.

A. Three-Dimensional Position Localization Approach

FIG. 4 is a schematic drawing of a cross-sectional view of components of an NBD 10 that can use the first approach to generate three dimensional image data of an object 130 having an object point source 130(*a*), according to embodiments of the invention. In the illustrated example, the NBD 10 includes an illumination module 100 for generating an illuminating nondiffracting beam 112(*a*) and an NBDM 200 for localizing the three-dimensional position of an object point source 130(*a*) that alters (e.g., scatters) light of the illuminating nondiffracting beam 112(*a*). The NBD 10 uses the three dimensional position and brightness of the object point source 130(*a*) to generate three-dimensional image data and a three-dimensional image of the object 130. The NBD 10 also includes an x-axis, a y-axis (not shown), and a z-axis.

In this first approach, each illuminating nondiffracting beam 112(*a*) has an NBDM 200 associated with it. In the illustrated embodiment, a single illumination module 100 providing a single illuminating nondiffracting beam 112(*a*) is associated with a single NBDM 200. In other embodiments, the NBD 10 may include a plurality of illumination modules 100 associated with a plurality of NBDMs 200, each illumination module 100 generating a single illuminating nondiffracting beam 112(*a*) and associated with a single NBDM 200.

In FIG. 4, the illumination module 100 includes an illumination source 110 and a scanning mechanism 120. The illumination source 110 generates an illuminating nondiffracting beam 112(*a*) having a narrowly structured illumination path along a beam axis 115. The nondiffracting beam 112(*a*) propagates normal to the XY plane in the illustrated example. In other examples, the nondiffracting beam 112(*a*) may propagate at an angle, β, from the x-axis and/or at an angle, γ, from the y-axis. The illumination source 110 may include any suitable nondiffracting beam generator to generate the illuminating nondiffracting beam 112(*a*). Some examples of suitable nondiffracting beam generators (e.g., a custom designed CGH with plane wave excitation beam) are described in Section IA.

In FIG. 4, the scanning mechanism 120 is associated with the illumination source 110 such that it is able to move the illumination source 110 relative to the object 130. In other embodiments, the scanning mechanism 120 may be associated with object 130 or specimen stage (e.g., slide) such that it is able to move the object 130 relative to the illumination source 110. The scanning mechanism 120 can be based on any suitable method such as microfluidic flow, optical tweezing, scanning (raster scanning, linear scanning, etc.). Although the illumination source 110 and scanning mechanism 120 are shown as components of the NBD 10 in the illustrated example, one or both of these components may be separate from the NBD 10 in other embodiments.

In FIG. 4, the object 130 includes an object point source 130(*a*). The object point source 130(*a*) alters (e.g., scatters and/or absorbs and re-emits) light from the illuminating nondiffracting beam 112(*a*). The object point source 130(*a*) has a three-dimensional position (X, Y, and Z position). The height, h, of the object point source 130(*a*) is the Z position. Although a single object point source 130(*a*) may be shown, an object 130 may have two or more object point sources 130(*a*) in other embodiments.

The NBD 10 includes a multi-layer body 201 having a surface layer 202 with a first surface 202(*a*) and a second surface 202(*b*), a light detector layer 203 having a light detector 220, and a separation layer 216 between the light detector layer 203 and the surface layer 202. The layers of a multi-layer body 201 may be of any suitable material or combination of materials having any suitable thickness or thicknesses. The layers of the multi-layer body 201 may also include any suitable device (e.g., light detector 220). The separation layer 216 may be made of a transparent material or a void. The separation layer 216 may have any suitable thickness, w. In some cases, the thickness of the separation layer 216 may be designed to maximize the efficiency of the NBD 10.

Although the body 201 in FIG. 2 has certain layers, other embodiments may integrate, omit, or add one or more layers or change the location of one or more layers in the body 201. In a fluorescence embodiment, a body 201 may include an additional filter layer 214 (shown in FIG. 6) within the separation layer 216. In another example, a body 201 may include a transparent protective layer outside the first surface 202(*a*) to isolate the surface layer 202. In another example, the body 201 omits the separation layer 216.

In FIG. 4, the surface layer 202 (e.g., thin metallic layer) includes a first surface 202(*a*), a second surface 202(*b*), a light transmissive region 204, and a microaxicon 210 fitted in the light transmissive region 204. The light transmissive region 204 may be of any suitable size (e.g., 0.1 μm, 0.5 μm, 1 μm, 5 μm, etc.) and have any suitable cross sectional shape (e.g., circular, rectangular, oval, etc.). In many cases, the light transmissive region 204 is a hole or a slit. In some of these cases, the holes/slits may be at least partially filled with a transparent material.

The microaxicon 210 is located in the light transmissive region 204 in the surface layer 202 to receive light passing through the light transmissive region 204 from the illumination module 100. The microaxicon 210 generates a single detection nondiffracting beam 212 for each object point source 130(*a*) (scatterer/fluorophore) illuminated by its illuminating nondiffracting beam 112(*a*). In FIG. 4, the microaxicon 210 receives light altered by the object point source 130(*a*) in the form of a scattering cone 122 and converts the light received into a single detection nondiffracting beam 212 at a propagation angle, $\theta_x$. Although a single detection nondiffracting beam 212 is shown, two or more detection nondiffracting beams 212 may be generated by the a microaxicon 210 in other embodiments having two or more object point sources 130(a). Although a single light transmissive region 204 with a single microaxicon 210 is shown in the illustrated embodiment, any suitable number of light transmissive regions 204 and microaxicons 210 may be used in other embodiments.

The multi-layer body 201 may be fabricated using standard semiconductor and micro/nanofabrication procedures. During an exemplary assembly of the multi-layer body 201, the separation layer 216 can be placed on top of the light detector 220. Then, the surface layer 202 with the light transmissive region 204 fitted with the microaxicon 210 can be placed on top of the separation layer 216. In another embodiment, the multi-layer body 201 omits the separation layer 216. In this embodiment, the surface layer 202 with the light transmissive region 204 fitted with the microaxicon 210 can be placed directly on top of the light detector layer 203 having the light detector 220 (e.g., CMOS sensor).

The illumination module 100 and/or NBDM 200 may include one or more layers of the body 201. In the illustrated example, the NBDM 200 includes the surface layer 202, the light detector layer 203, and the separation layer 216.

The illuminating nondiffracting beam 112(a) is offset from the center of the microaxicon 210, by a beam offset, k. The beam offset, k, is the Euclidean distance on the XY plane between the center of the beam and the center of the microaxicon 210.

The NBD 10 also includes an x-axis, a y-axis (not shown), and a z-axis. The x-axis and y-axis lie in the plane of the first surface 202(a) of the surface layer 202. The z-axis is orthogonal to this plane.

In FIG. 4, the light detector 220 includes six light detecting elements 220(a)(1), 220(a)(2), 220(a)(3), 220(a)(4), 220(a)(5), and 220(a)(6) arranged in the X-direction. Each light detecting element 220(a) may be of any suitable size (e.g., 1-10 microns) and any suitable shape (e.g., circular or square). Although a one dimensional array of six light detecting elements 220(a) is shown, the light detector 220 may include any suitable number of light detecting elements 220(a) in any suitable form (e.g., two-dimensional array), and in any suitable orientation(s) in other embodiments. Each light detecting element 220(a) can receive one or more detection nondiffracting beams 212 and can generate a signal with the light data associated with the one or more detection nondiffracting beams 212 received.

The light data may include, for example, information about the properties of the light detected such as the intensity (brightness) of the light, the wavelength(s) of the light, the frequency or frequencies of the light, the polarization(s) of the light, the phase(s) of the light, the spin angular momentum(s) of the light, and/or other light properties associated with the one or more nondiffracting beams 212 detected by the light detecting elements 220(a). Light data may also include the X location and Y location of the light detecting elements 220(a) receiving the one or more nondiffracting beams 212 and the time that the light was detected by the light detecting elements 220(a). Light data may be data based on a single time, based on multiple times, or based on a time varying basis.

Light data from a light detecting element 220(a) may include the three-dimensional position of the point of detection 250 of the nondiffracting beam 212 detected by the light detector 220. The point of detection 250 refers to the point at the intersection detection nondiffracting beam 212 and the light detector plane 222. In some cases, the three-dimensional position of the point of detection 250 may be estimated as the center or other specific location of the light detecting element 220(a) receiving detection nondiffracting beam 212 at the light detecting plane 222.

The NBDM 200 can measure the Euclidean distance, d on the XY plane between the point of detection 250 and a z-directional axis running through the object point source 130(a). In FIG. 4, the distance, d, is the Euclidean distance on the XY plane between the point of detection 250 and the nondiffracting beam axis.

The NBDM 200 can generate three-dimensional image data based on the light data. Some suitable three-dimensional data includes the three-dimensional position of the object point source 130(a), the propagation angle of the detection nondiffracting beam 212, and the distance d.

Although not shown, the NBD 10 also includes a processor 230 (shown in FIG. 1) communicatively coupled to the light detector 220 and a CRM 240 communicatively coupled to the processor 230. The processor 230 executes code stored on the CRM 240 to perform some of the functions of NBD 10. For example, the processor 230 can receive a signal with the light data from the light detector 220 and generate three-dimensional image data of the object 130 based on the light data. The processor 230 may also generate one or more three-dimensional images of the object 130 or a portion of the object 130 based on three-dimensional image data.

In FIG. 4, the object point source 130(a) alters (e.g., scatters and/or absorbs and re-emits) light from the illuminating nondiffracting beam 112(a) in the form of a cone 122 (e.g., scattering cone or diffraction cone). In many other embodiments, the cone 122 is much wider. The cone 122 includes a solid angle subtended by the light transmissive region 204 angle, ω The cone 122 also includes a cone angle in the X-direction, $\theta_x$, between the central axis of the cone 122 and the x-axis. The cone 122 also includes a cone angle in the Y-direction, $\theta_y$ (not shown), formed between the central axis of the cone 122 and the y-axis. The microaxicon 210 receives light altered by the object point source 130(a) through the light transmissive region 204 and converts the altered light from the object point source 130(a) into a single detection nondiffracting beam 212 propagating at an angle, $\theta_x$ in the XZ plane. The detection nondiffracting beam 212 may also propagate at a propagation angle in the Y-direction, $\theta_y$ (not shown) in the YZ plane.

The propagation angle (in XZ plane), $\theta_x$, of the detection nondiffracting beam 212 uniquely corresponds to the height, h, (Z position) of its corresponding object point source 130(a). It is this phenomenon that enables the NBD 10 to sense the third dimension (Z position). As illustrated in FIG. 4, the detection nondiffracting beam 212 associated with the object point source 130(a) at point 1 in the object 130 is sensed at point 1' on the light detector 220. In other words, the Z position of the object 130 is encoded in the X position of the light detector plane 222. By estimating the distance, d, of the detection nondiffracting beam 212 on the light detector plane 222, the height (h; Z position) of an object point source 130(a) can be directly determined as, $$h = wk\left(\frac{1}{d}\right) \qquad \text{(Eqn. 1)}$$

where w is the width of the separation layer, d is the Euclidean distance on the XY plane between the point of detection and z-directional axis passing through the object point source, and k is the beam offset distance between the center of the microaxicon 210 and z-directional axis passing through the object point source 130(a).

The X position and Y position of the object point source 130(a) can be determined from the location of the illuminating nondiffracting beam 112(a) at the time of detection, which is based on the known location of the illumination module at the time that the object point source 130(a) is illuminated. In FIG. 4, the illuminating nondiffracting beam 112(a) propagates in the Z-direction so that the X and Y positions of the object point source 130(a) are the same as the known X and Y position of the beam axis 115 at the time at which the object point source 130(a) is illuminated. In other embodiments, the nondiffracting beam 112(a) may propagate at an angle from the x-axis and/or y-axis. In these embodiments, the X and Y positions of the object point source 130(a) can be determined based propagation angle of the illuminating nondiffracting beam 112(a).

The brightness (intensity) of the object point source 130(a) is obtained from the total number of photons detected by the light detecting element 220(a)(4) corresponding to that object point source 130(a). A three-dimensional image of the object 130 can be obtained by plotting the X, Y, and Z positions of all detected object point sources 130(a) along with their corresponding brightness values.

Based on Eqn. 1, each light detecting element 220(a) in an NBDM 200 and at a particular distance, d is associated with a specific height (Z position) in the object 130. Since the position of the illuminating nondiffracting beam 112(a) is known at a the time of detection, each light detecting element 220(a) in an NBDM 200 is also associated with a particular X and Y position of the illuminating nondiffracting beam 112(a) at the time of detection. In this way, each light detecting element 220(a) can be assigned a three position at the time of detection. Each light detecting element 220(a) can then measure the intensity (brightness) associated with a particular three-dimensional position in the object at a given time.

In photon limited applications such as fluorescence imaging, it is important to have good photon collection efficiencies for achieving three-dimensional imaging with high signal to noise ratios. Collection efficiency is defined as, $$\text{Collection efficiency} = \frac{\text{Solid Angle subtended by light transmissive region}(\Omega)}{4\pi} \times 100 \quad \text{(Eqn. 2)}$$

$$\text{Collection efficiency} = \frac{2a^2 h}{\left[\sqrt{h+(k-a)^2} + \sqrt{h+(k+a)^2}\right]^3} \times 100 \quad \text{(Eqn. 3)}$$

where 'a' is the radius of the light transmissive region 204 (e.g., aperture).

In one embodiment, an NBD 10 can be designed to address specific sampling requirements based on Eqn. 3. For example, if the portion of interest of the object is located at a particular height, the NBD 10 can be designed so that the illuminating nondiffracting beam 112(a) offset, k, has a value such that the collection efficiency, based on Eqn. 3, will be maximum for the particular height.

Figure 5A:
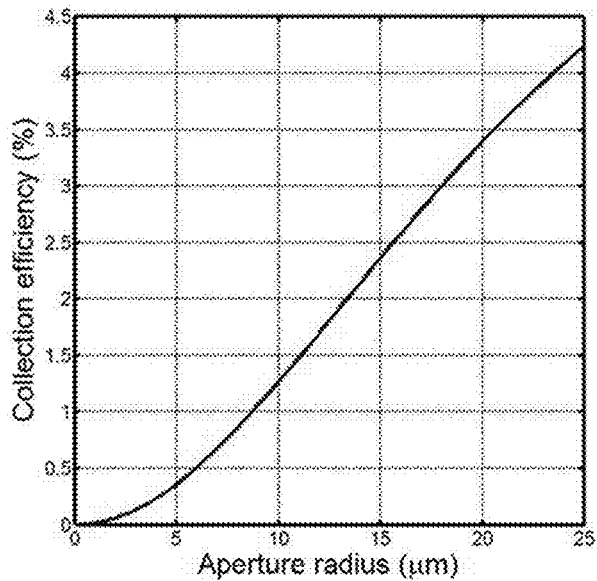
FIG. 5(a) is a plot of the collection efficiency of a nondiffracting beam detecting device for three-dimensional imaging as a function of aperture radius, according to an embodiment of the invention.
Figure 5B:
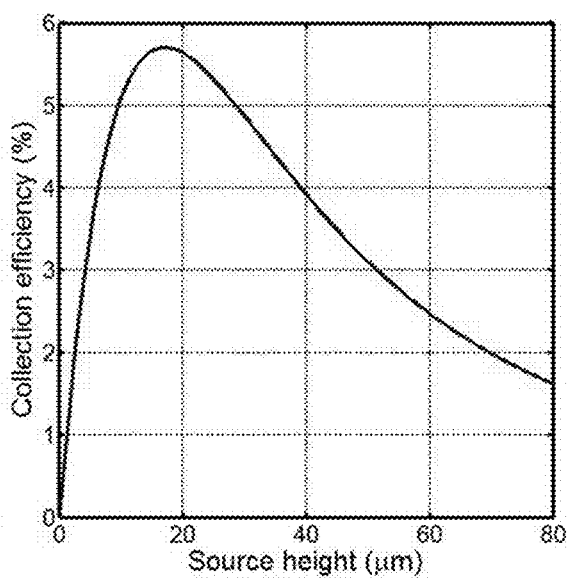
FIG. 5(b) is a plot of the collection efficiency of a nondiffracting beam detecting device for three-dimensional imaging as a function of the height, h, of the object point source, according to an embodiment of the invention.

FIG. 5(a) is a plot of the collection efficiency of an NBD 10 as a function of aperture radius, according to an embodiment of the invention. FIG. 5(b) is a plot of the collection efficiency of an NBD 10 as a function of the height, h, of the object point source 130(a), according to an embodiment of the invention. The point source height, h, is 40 μm and k is (a+2) μm in FIG. 5(a) and the light transmissive region (e.g., aperture) radius is 23 μm and k is 25 μm in FIG. 5(b). The collection efficiency monotonously increases with increasing aperture size, but exhibits a rather interesting non-monotonous behavior when plotted as a function of height. This is because of the fact that the light transmissive region (e.g., aperture) is slightly displaced (by distance k) from the illuminating nondiffracting beam 112(a). With this understanding, the parameters of our NBD 10 can be designed appropriately for addressing sample specific requirements. Also, from FIG. 5(b), note that the detected brightness of an object point source 130(a) is always influenced by the point's height. This displacement creates a brightness modulation that causes a difference between the actual and measured brightness of the sample by the NBD 10.

This brightness modulation by varying collection efficiency can be corrected in the light data before generating the three-dimensional image data and the three-dimensional image, in some embodiments. In one embodiment, the brightness modulation can be corrected by calibrating the NBD 10 to correct for the brightness modulation. For a given design of the NBD 10, calibrations curves can be experimentally generated to determine the brightness modulation of the system. The calibration curves can then be applied to correct the measured light data for brightness modulation to determine the actual light data from the source.

The transverse (X,Y) resolution of the NBD 10 is not limited by the size of the light transmissive region 204 (e.g., aperture). Instead, it is only limited by the spot size of the illuminating nondiffracting beam 112(a) generated by a suitable nondiffracting beam generator (e.g., CGH). The axial (Z) resolution of the NBD 10 is limited by the spot size of the detection nondiffracting beam 212 produced by the microaxicon 210. In addition, the inverse relationship between 'h' and 'd' in Eqn. 1 affects the Z sensitivity of the NBD 10.

In operation, the illumination module 100 provides an illuminating nondiffracting beam 112(a) across a portion of the object 130(a). Each object point source 130(a) alters (e.g., scatters and/or absorbs and re-emits) light from the illuminating nondiffracting beam 112(a) in the form of a cone 122 (e.g., scattering cone or diffraction cone). The microaxicon 210 receives light altered by each object point source 130(a) through the light transmissive region 204 and converts the altered light from each object point source 130(a) into a single detection nondiffracting beam 212 propagating at an angle, $\theta_x$ in the XZ plane. The detection nondiffracting beam 212 may also propagate at a propagation angle in the Y-direction, $\theta_y$ (not shown) in the YZ plane.

The light detector 220 receives each detection nondiffracting beams 212 associated with each object point source 130 (a). In FIG. 4, the fourth detecting element 220(a)(4) receives the nondiffracting beam 212 at the point of detection 250. Each light detecting element 220(a) generates a signal with light data (e.g., intensity reading) and the location of the fourth detecting element 220(a) receiving the detection nondiffracting beams 212 and/or the three-dimensional position of the point of detection 250. For each object point source 130(a), the processor 230 determines the Euclidean distance, d, in the XY plane between the point of detection and a z-directional axis passing through the object point source 130(a). For each object point source 130(a), the processor 230 also determines the beam offset distance, k. Using Eqn. 1, the determined k and d, and the known width (w) of the separation layer, the processor 230 determines the three-dimensional position (X, Y, and Z position) of each object point source 130(a) associated with the intensity reading at all the times during the operation. The processor 230 combines the intensity data at the determined X, Y and Z positions at the reading times during the operation to generate three-dimensional image data. The processor 230 then generates one or more three-dimensional images of the object 130 based on the three-dimensional image data.

1) Optofluidic Application

Optofluidic microscopes (OFMs) seek to revisit the fundamentals of microscopy, right from the theory of image formation. With an understanding that lens based imaging is primarily responsible for the bulkiness of traditional microscopes, OFMs eliminate the need for lenses by adopting a direct projection method through submicron scale metal apertures fabricated on a complementary metal oxide semiconductor (CMOS) sensor. A two dimensional (2D) image of the object is obtained by first flowing a specimen with the object over these apertures using a fluid channel, and by then combining the one dimensional signals obtained from the pixels (light detecting elements) under these apertures. With a size not bigger than a dime, and a price not more than a few dollars, OFMs can produce images comparable to the state of the art bulky expensive microscopes. Although originally developed for bright field imaging, OFM imaging modalities have now expanded to achieve DIC, dark field, and color imaging, all in two dimensions.

Three dimensional imaging in conventional OFMs is hindered by the fact that, unlike traditional microscopes, focus is not an adjustable parameter in the OFM imaging process. The best focus plane in a conventional OFM is typically the plane immediately above the apertures. The transverse planes further above the apertures can suffer from intense blurring, with the amount of blurring increasing as a function of the plane's height from the apertures.

In some embodiments, an NBD 10 uses optofluidic flow as a scanning mechanism 120 to provide a highly compact, inexpensive, and robust device with highly automatable, high-throughput, three-dimensional imaging with submicron scale resolution.

FIG. 6 is a schematic drawing of components of an NBD 10 using optofluidic flow as a scanning mechanism and takes the first approach to generating three dimensional image data and three-dimensional images of an object 130, according to embodiments of the invention. The NBD 10 includes an array of illumination modules 100 and an array of NBDMs 200 located adjacent to their illumination counterparts. The NBD 10 also includes an x-axis, a y-axis, and a z-axis. Each of the modules in the arrays is comprised of an x-directional strip having a strip width in the y-direction and a strip length in the y-direction. In some cases, the strip width may be equal to the distance between the light transmissive regions 204 in the y-direction. The strip length may be equal to the length of the NBD 100 in the x-direction. The strips may overlap in the y-direction in some cases. Any suitable number of illumination modules 100 and corresponding NBDMs 200 may be used.

In FIG. 6, the NBD 10 senses the three-dimensional position (X, Y, and Z position) of object point sources 103(*a*) in the object 130 by first using the array of illumination modules 100 to structure the illumination path to exhibit an array of illuminating nondiffracting beams 112(*a*), and by then using an array of NBDMs 200 located adjacent to their counterparts. In the NBD 10, each illumination module 100 provides a single illuminating nondiffracting beam 112(*a*). Each NBDM 200 senses the three-dimensional position (X, Y, and Z position) of one or more object point sources 103(*a*) illuminated by the corresponding illuminating nondiffracting beam 112(*a*) from the adjacent illumination module 100. Together, the arrays of illumination modules 100 and NBDMs 200 have the ability to localize the three-dimensional position and brightness of each object point source 130(*a*) in the object 130 of the specimen within a single pass of the specimen over the array of light transmissive regions 204. This information can be combined to form the three-dimensional image of the object 130.

In FIG. 6, the object 130 includes a first object point source 130(*a*)(1) at point 1 and a second object point source 130(*a*)(2) at point 2, being illuminated by an illuminating nondiffracting beam 112(*a*). In other embodiments, the object 130 may include other object point sources 130(*a*) at one or more illuminating nondiffracting beams 112(*a*). Each object point source 130(*a*) has a three-dimensional position (X, Y, and Z positions). The height, h, of the object point source 130(*a*) is the Z position. In FIG. 6, the first object point source 130(*a*) (1) at point 1 has a Z position of $h_1$, and the second object point source 130(*a*)(2) at point 2 has a Z position of $h_2$.

The NBD 10 also includes a multi-layer body 201, which may be fabricated using standard semiconductor and micro/nanofabrication procedures. The body 201 includes a channel layer 160 having a holographic element 170 (e.g., CGH), a surface layer 202 (e.g., thin metallic layer) having a first surface 202(*a*) and a second surface 202(*b*), the light detector layer 203 having a light detector 220, and a separation layer 216 between the holographic element 170 and the light detector 220. The layers of a multi-layer body 201 may be of any suitable material or combination of materials having any suitable thickness or thicknesses. The layers of the multi-layer body 201 may also include any suitable device (e.g., light detector 220). The separation layer 216 may be made of a transparent material. The separation layer 216 may have any suitable thickness, w. In some cases, the thickness of the separation layer 216 may be designed to maximize the collection efficiency of the NBD 10. In FIG. 6, the x-axis and y-axis lie in the plane of the first surface 202(*a*) of the surface layer 202. The z-axis is orthogonal to this plane.

The separation layer 216 may optionally include a filter layer 214, which can be used in fluorescence imaging. The filter layer 214 may include any suitable device(s) (e.g., optical filters) capable of selectively transmitting light having select light properties (e.g., polarization, wavelength, frequency, intensity, phase, spin angular momentum, etc.) while substantially removing light the remaining light by any suitable method such as reflection, absorption or interference. Some examples of suitable devices include filters (e.g., interference filters, absorption filters, etc.). Any type of filter can be used such as dichroic filters, monochromatic filters, etc. In one embodiment, a polarization filter may be used. In the illustrated embodiment, the optional filter layer 214 can be used in fluorescence and phosphorescence applications, to transmit emissions from fluorophores in the object 130 and substantially removes excitation light.

Although the body 201 in FIG. 6 has certain layers, other embodiments may integrate, omit, or add one or more layers or change the location of one or more layers in the body 201. For example, a body 201 may include a transparent protective layer outside the first surface 202(*a*) to isolate the surface layer 202. In another example, the body 201 omits the separation layer 216.

The body 201 also defines or includes a fluid channel 150 which has a channel layer 160 having a first channel surface 150(*a*) and an opposing second channel surface which coincides with the first surface 202(*a*) of the surface layer 202. The fluid channel 150 also has a longitudinal axis, a first lateral side, and a second lateral side. The fluid channel 150 may have any suitable dimensions. For example, the width and/or height of the fluid channel 150 may each be less than about 10 microns, 5 microns, or 1 micron. In some cases, the fluid channel 150 may be sized based on the size of the objects 130 being imaged by the NBD 10. The fluid channel 150 may also include a fluid flow that can carry the specimen with one or more objects 130 in the general direction of the longitudinal axis. During fabrication, the holographic element 170 may be placed directly on top of the fluid channel 150 in some embodiments.

The surface layer 202 of the body 201 includes an array of light transmissive regions 204 corresponding and offset from the array of illuminating nondiffracting beams 112(a). Each light transmissive region 204 is fitted with a microaxicon 210. Each light transmissive region 204 may be of any suitable size and cross-sectional shape. Each light transmissive region 204 may be a hole or a slit. In some cases, the hole/slit may be partially filled with a transparent material.

In FIG. 6, the surface layer 202 also includes an array of microaxicons 210 corresponding to the array of light transmissive regions 204. Each microaxicon 210 is located in the light transmissive region 204 in the surface layer 202 to receive light passing through the light transmissive region 204. Each microaxicon 210 generates a single detection nondiffracting beam 212 for each object point source 130(a) (scatterer/fluorophore) illuminated by its illuminating nondiffracting beam 112(a). In FIG. 6, a microaxicon 210 receives light altered by a first object point source 130(a)(1) at point 1 and a second object point source 130(a)(2) at point 2 and converts the light received into two detection nondiffracting beam 212 at two different propagation angles.

The arrays of light transmissive regions 204, the array of microaxicons 210, and the array of illuminating nondiffracting beams 112(a) are oriented at an array angle, α. Each of the arrays extends across or extends substantially across from the first lateral side to the second lateral side of the fluid channel 150 or alternatively extends across an examining portion of the fluid channel 150 where the object 130 being examined moves through.

The layers of the body 201 may include any suitable material or combination of materials having any suitable thickness, and may include any suitable devices (e.g., light detector 220). For example, the surface layer 202 may be made of Polydimethylsiloxane (PDMS). Although FIG. 6 has certain layers, other embodiments may integrate, omit, or add one or more layers or change the location of one or more layers in the body 201. For example, the body 210 may include a transparent protective layer outside the first surface 202(a) to isolate the surface layer 202.

As a group, the array of illumination modules 100 includes an illumination source 110 coupled to a scanning mechanism 120. The scanning mechanism 120 includes the fluid channel 150 which can have a fluid flow for moving the object 130 through the array of illuminating nondiffracting beams 112(a) and across the array of light transmissive regions 204. The illumination source 110 includes any suitable nondiffracting beam generator for generating the array of illuminating nondiffracting beams 112(a) (e.g. Bessel beams). In FIG. 6, the illumination source 110 includes a holographic element 170 (e.g., a custom designed CGH) illuminated by a plane wave excitation beam 142. An example of a suitable holographic element 170 is described in detail in Section IA. Upon being illuminated by the plane wave from the excitation beam 142, the holographic element 170 produces the array of well separated illuminating nondiffracting beams 112(a). The distance between the illuminating nondiffracting beams 112(a) is designed to reduce or eliminate crosstalk. In other embodiments, other nondiffracting beam generators may be used.

Each of the illuminating nondiffracting beams 112(a) in FIG. 6 has a narrowly structured illumination path along a beam axis 115 (shown in FIG. 4). In FIG. 6, each illuminating nondiffracting beam 112(a) propagates perpendicular to the XY plane. In other embodiments, the illuminating nondiffracting beam 112(a) may propagate at an angle, β, from the x-axis and/or at an angle, y, from the y-axis.

In each illumination module and NBDM 200 pair, the illuminating nondiffracting beam 112(a) is offset from the center of the microaxicon 210, by a beam offset, k. The beam offset, k, is the Euclidean distance on the XY plane between the center of the illuminating nondiffracting beam 112(a) and the center of the microaxicon 210.

As a group, the array of NBDMs 200 includes the surface layer 202, the light detector layer 203 having the light detector 220 with a detecting plane 222, the separation layer 216 between the light detecting plane 222 and the second surface 202(b) of the surface layer 202.

The light detector 220 includes discrete light detecting elements 220(a). The light detecting elements 220(a) may be in any suitable arrangement (e.g., one-dimensional array, two-dimensional array, or a multiplicity of one-dimensional and two-dimensional arrays). The arrays can be in any suitable orientation or combination of orientations. Each light detecting element 220(a) may be of any suitable size (e.g., 1-10 microns) and any suitable shape (e.g., circular or square).

In FIG. 6, each of the detection nondiffracting beams 212 projects a light spot 270 onto the light detector 220 at a particular location. The light spot 270 projected to point 1' is associated with the object point source 130(a)(1) at point 1. The light spot 270 projected to point 2' is associated with the object point source 130(a)(2) at point 2.

The light detecting element(s) 220(a) receiving the detection nondiffracting beams 212 can generate a signal with time varying light data associated with the nondiffracting beam 112 received, as the object 130 moves through the fluid channel 150. The light detecting element 220(a) at point 1' will measure time varying light data associated with object point source 130(a)(1) at point 1. The light detecting element 220(a) at point 2' will measure time varying light data associated with object point source 130(a)(2) at point 2.

The time varying light data may include, for example, information about the properties of the light detected such as the intensity of the light, the wavelength(s) of the light, the frequency or frequencies of the light, the polarization(s) of the light, the phase(s) of the light, the spin angular momentum(s) of the light, and/or other light properties associated with the one or more nondiffracting beams 212 detected by the light detecting elements 220(a), at the time of detection. Time varying light data may also include the location of the light detecting elements 220(a) receiving the one or more nondiffracting beams 212 and the time that the light was detected by the light detecting elements 220(a). For example, the time varying light data from the light detecting element 220(a) at point 1' may include the location of point 1' and the intensity of the detection nondiffracting beam 212 measured at point 1' at different times. As another example, the time varying light data from the light detecting element 220(a) at point 2' may include the location of point 2' and the intensity of the detection nondiffracting beam 212 measured at point 2' at different times.

Time varying light data from a light detecting element 220(a) may include the three-dimensional position of the point of detection 250 (shown in FIG. 4) of the nondiffracting beam 212 detected by the light detector 220 at the time of detection. In some cases, the processor 230 may estimate the three-dimensional position of the point of detection 250 as the center or other specific location of the light detecting element 220(*a*) receiving detection nondiffracting beam 212 at the light detecting plane 222.

The NBDM 200 can generate three-dimensional image data based on the time varying light data. Some suitable three-dimensional data includes the distance d, the propagation angle of the detection nondiffracting beam 212, three-dimensional position of the object point source 130(*a*), and the intensity or other light property associated with each of the object point sources 130(*a*).

Although not shown, the NBD 10 in FIG. 6 also includes a processor 230 communicatively coupled to the light detector 220 and a CRM 240 communicatively coupled to the processor 230. The processor 230 executes code stored on the CRM 240 to perform some of the functions of NBD 10. For example, the processor 230 can receive a signal with the time varying light data from the light detector 220 and generate three-dimensional image data of the object 130 based on the time varying light data. The processor 230 may also generate one or more three-dimensional images of the object 130 or a portion of the object 130 based on the three-dimensional image data.

In the embodiment shown in FIG. 6, the holographic element 170 on top of the fluid channel 150 can be illuminated with a spatially coherent, incoherent, or partially coherent excitation beam 142 to generate the array of illuminating nondiffracting beams 112(*a*) that propagate through the height of the fluid channel 150 without diffracting or with highly reduced diffraction. The array of illuminating nondiffracting beams 112(*a*) is oriented at a small angle to the X axis, so as to sample different points along the Y axis. When an object 130 is present in the fluid channel 150, each illuminating nondiffracting beam 112(*a*) illuminates a vertical line (along Z) in the object at a given instant of time. As the sample flows (along X), each illuminating nondiffracting beam 112(*a*) consequently illuminates a XZ slice of the object 130. Because the array of illuminating nondiffracting beams 112(*a*) are designed to sample different Y locations, each illuminating nondiffracting beam 112(*a*) illuminates in the array illuminates a subsequent XZ slice of the object. Therefore, within a single pass thorough the array of illuminating nondiffracting beams 112(*a*), the entire three-dimensional object volume is illuminated.

The microaxicon 210 of the NBDM 200 generates a detection nondiffracting beam 212 for each object point source (e.g., scaterrer/fluorophore) 130 illuminated by its illuminating nondiffracting beam 112(*a*). The altered light from the object point source 130(*a*)(2) at point 2 received by the corresponding light transmissive region 204 is illustrated as a cone 122. The propagation angle (in XZ plane) of the detection nondiffracting beam 212 uniquely corresponds to the height of its corresponding point source 130(*a*). It is this phenomenon that enables the NBD 10 to sense the third dimension (Z Position). As illustrated, the detection nondiffracting beam 212 created by the object point source 130(*a*)(1) at point 1 in the object 130 is sensed at point 1' on the light detector 220, and the detection nondiffracting beam 212 from the object point source 130(*a*)(2) at point 2 is sensed at point 2' on the light detector 220. In other words, the Z dimension of the object 130 is encoded in the X dimension of the sensor plane. By estimating the distance (d) of the detection nondiffracting beam 212 on the sensor plane, the height (h; Z position) of an object point source 130(*a*) can be directly determined as, $$h = wk\left(\frac{1}{d}\right) \quad \text{(Eqn. 1)}$$

The X position of the object point source 130(*a*) is estimated from the time at which the point is imaged as the object flows through the fluid channel of the system. And the Y position of the object point source 130(*a*) is obtained directly from the Y position of the NBDM 200. The brightness of the object point source 130(*a*) is obtained from the total number of photons detected by the light detecting element 220(*a*) corresponding to that object point source 130(*a*). The three dimensional image is obtained by plotting the X, Y, and Z positions of all detected object point source 130(*a*) along with their corresponding brightness values.

In photon limited applications such as fluorescence imaging, it is important to have good photon collection efficiencies for achieving three-dimensional imaging with high signal to noise ratios. Collection efficiency is defined in Eqns. 2 and 3, where 'a' is the radius of the aperture.

In one embodiment, an NBD 10 can be designed to address specific sampling requirements based on Eqn. 3. For example, if the portion of interest of a specimen is located at a particular height, the NBD 10 can be designed so that the nondiffracting beam 112(*a*) offset, k, has a value such that the collection efficiency, based on Eqn. 3, will be maximum for the particular height.

FIGS. 5(*a*) and 5(*b*) are plots of collection efficiencies of the NBD 10 as a function of aperture radius and source height, according to an embodiment of the invention. From FIG. 5(*b*), the detected brightness of an object point source 130(*a*) is always influenced by the point's height. This displacement creates a brightness modulation that causes a difference between the actual and measured brightness of the sample by the NBD 10.

This brightness modulation by varying collection efficiency can be corrected in the light data before generating the three-dimensional image data and the three-dimensional image, in some embodiments. In one embodiment, the brightness modulation can be corrected by calibrating the NBD 10 to correct for the brightness modulation. For a given design of the NBD 10, calibrations curves can be experimentally generated to determine the brightness modulation of the system. The calibration curves can then be applied to correct the measured light data for brightness modulation to determine the actual light data from the source.

The transverse (X,Y) resolution of the NBD 10 is not limited by the size of the light transmissive region (e.g., aperture). Instead, it may only limited by the spot size of the illuminating nondiffracting beam 112(*a*) generated by a suitable nondiffracting beam generator (e.g., CGH). The axial (Z) resolution of the NBD 10 may be limited by the spot size of the detection nondiffracting beam 212 produced by the microaxicon 210. In addition, the inverse relationship between 'h' and 'd' in Eqn. 1 affects the Z sensitivity of the NBD 10.

B. Perspective Projections Approach

Using the perspectives projections approach, the NBD 10 measures several two-dimensional images (perspective projections) of the object 130 over different fields of view (viewing angles), and uses tomography algorithms to estimate a three-dimensional image of the object 130 from the two-dimensional projections. In this approach, the NBD 10 includes an NBDM 200 in the presence of uniform illumination 112(*b*).

FIGS. 7(*a*), 7(*b*), and 7(*c*) illustrate the fundamentals behind obtaining perspective projections. FIG. 7(*a*) is a schematic drawing of an NBD 10 which measures light data from a wide viewing angle and an associated plot of the calculated point spread function (PSF) as a function of source position, according to an embodiment of the invention. FIGS. 7(*b*) and 7(*b*) are schematic drawings of an NBD 10 which measures perspective projections over narrow viewing angle, and the associated plots of calculated PSF as a function of point source position, according to an embodiment of the invention.

Figure 7A:
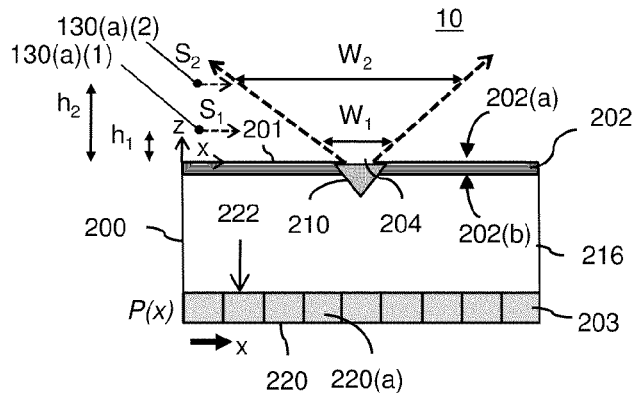
FIG. 7(a) is a schematic drawing of a nondiffracting beam detecting device for three-dimensional imaging which measures light data from a wide viewing angle and an associated plot of the calculated point spread function (PSF) as a function of source position, according to an embodiment of the invention.
Figure 7A:
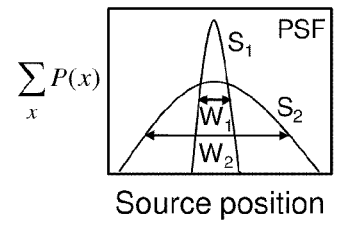
Figure 7B:
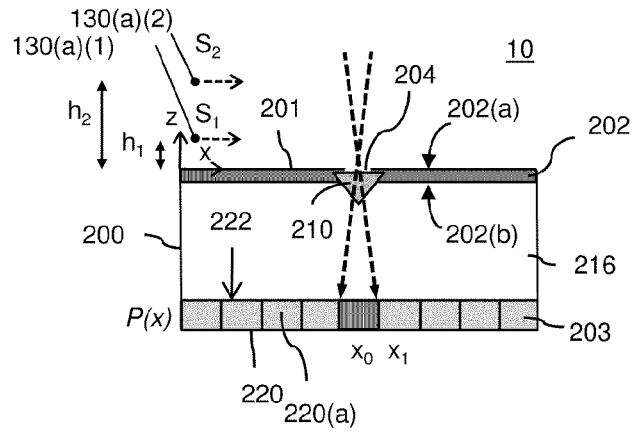
FIGS. 7(b) and 7(c) are schematic drawings of a nondiffracting beam detecting device for three-dimensional imaging, according to embodiments of the invention, which measures perspective projections over narrow viewing angle, and the associated plots of calculated PSF as a function of point source position.
Figure 7B:
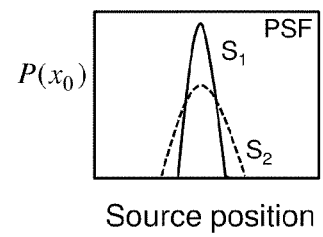
Figure 7C:
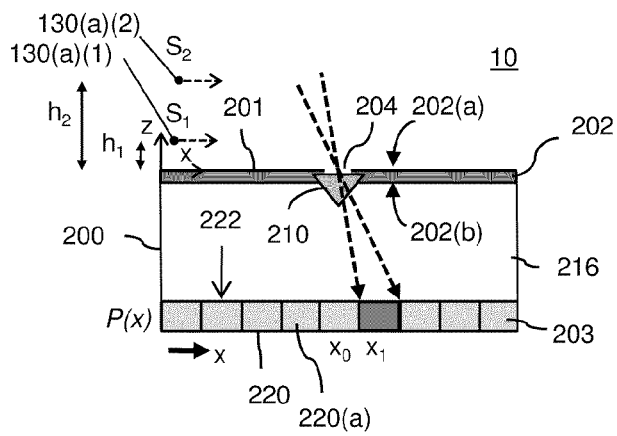
Figure 7C:
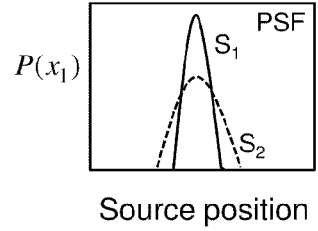

In FIGS. 7(a), 7(b), and 7(c), each NBD 10 includes an NBDM 200 with a multi-layer body 201 having a surface layer 202, a light detector layer 203 with a light detector 220 comprised of nine light detecting elements 220(a), and a separation layer 216 between the light detector 202 and the surface layer 202. The surface layer 202 includes a first surface 202(a) and a second surface 202(a), and a light transmissive region 204 fitted with a microaxicon 210. Two object point sources 130(a)(1) ($S_1$) and 130(a)(2) ($S_2$) (e.g., scattering particles) are shown moving in the x direction above the surface layer 202.

In FIG. 7(a), the NBDM 200 sums light data from all the light detecting elements 220(a) receiving light through a microaxicon 210, as object point sources 130(a)(1) ($S_1$) and 130(a)(2) ($S_2$) are scanned across the light transmissive region 204. As shown in FIG. 7(a), when light data from all light detecting elements 220(a) (e.g., pixels) is summed, the NBDM 200 in FIG. 7(a) has a wide viewing angle, with spatial resolutions degrading with increase in the distance between each of the object point sources 130(a)(1) and the light transmissive region 204, providing poor depth of field. This can be seen readily by scanning object point sources 130(a)(1) ($S_1$) and 130(a)(2) ($S_2$) located at different heights, $h_1$ and $h_2$, over the NBDM 200. As shown in the associated plot, the width of the PSF increases rapidly with the height of the point source 130(a). That is, the width, $w_1$ of the PSF of object point source 130(a)(1) ($S_1$) is much narrower than the width, $w_2$ of the PSF of object point sources 130(a)(2) ($S_2$). In addition, spatial resolutions degrade with increase in the distance between object point source 130(a) ($S_1$) and the light transmissive region 204 (e.g., aperture) and thus the NBD 10 exhibits poor depth of field. Also, by summing data over a wide viewing angle, the NBD 10 does not retain the direction (angle) of the photons.

However, the scenario changes when data from each light detecting element 220(a) (e.g., sensor pixels) is used individually to form image data. In this scenario, the NBD 10 can obtain perspective projections from each of the light detecting elements 220(a), each perspective projection having an extended depth of field. As used herein, a perspective projection refers to a two-dimensional image of the object 130 based on a small viewing angle.

For example, consider a situation where only the center light detecting element 220(a) ($X_0$) of the light detector 220 is used, as shown in FIG. 7(b). If the two point sources 130(a)(1) ($S_1$) and 130(a)(2) ($S_2$) at different heights, $h_1$ and $h_2$, are scanned again, it can be seen that the PSF width does not increase dramatically with height any longer. In other words, the viewing angle of the NBDM 200 has been reduced. Note that this small viewing angle (narrow field of view) also creates an "extended depth of field" image, where a large Z region of the object 130 is imaged in focus.

When the light detecting element 220(a) at $X_1$ (adjacent to $X_0$) is used for image formation, the NBDM 200 "sees" in a slightly different direction (projection angle) as illustrated in FIG. 7(c). In other words, two-dimensional images formed with light detecting element 220(a) at $X_1$ and $X_0$ represent different perspective projections of the object 130. By forming images from each light detecting element 220(a) of the light detector 220 (e.g., sensor array) within the NBDM 200, the NBD 10 can obtain different perspective projections of the object 130 at different projection angles. Each projection angle refers to the angle formed by the center axis through each viewing angle.

The basic idea is to use the light data from different light detecting elements 220(a) (e.g., pixels) of the NBDM 200 to obtain perspective projections (two-dimensional images) of the object 130 at different projection angles. These perspective projections, when fed into a tomography reconstruction algorithm, can then be used to create three-dimensional images of the object 130.

In FIGS. 7(b) and 7(c), the microaxicon 210 converts light passing through the light transmissive region 204 into two separate nondiffracting beams 212 propagating at different projection angles directing the detection nondiffracting beams 212 to two light detecting elements 220(a) at $X_0$ and $X_1$. The NBDM 200 can generate a perspective projection from the light data measured by each of the light detecting elements 220(a) $X_0$ and $X_1$ where the light data from each light detecting elements 220(a) $X_0$ and $X_1$ is associated with a different small viewing angle. Each generated perspective projection is associated with a projection angle corresponding to a viewing angle. The projection angle can be determined from the point of detection on the light detecting element 220(a). The NBDM 200 can generate a three-dimensional image of the object 130 using the generated perspective projections and the associated projection angles.

Figure 8:
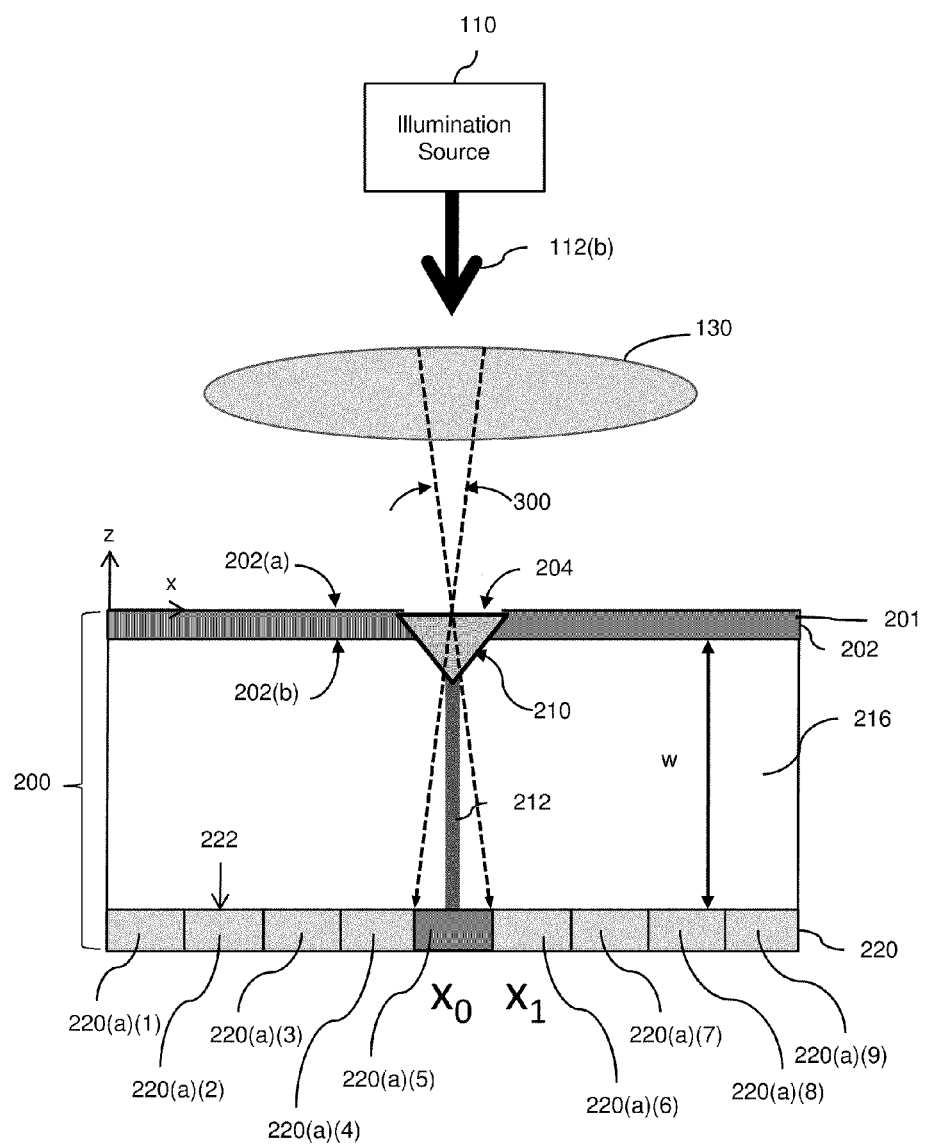
FIGS. 8 and 9 are schematic drawings of a cross-sectional view of components of a nondiffracting beam detecting device for three-dimensional imaging of an object based on perspective projections, according to embodiments of the invention.
Figure 9:
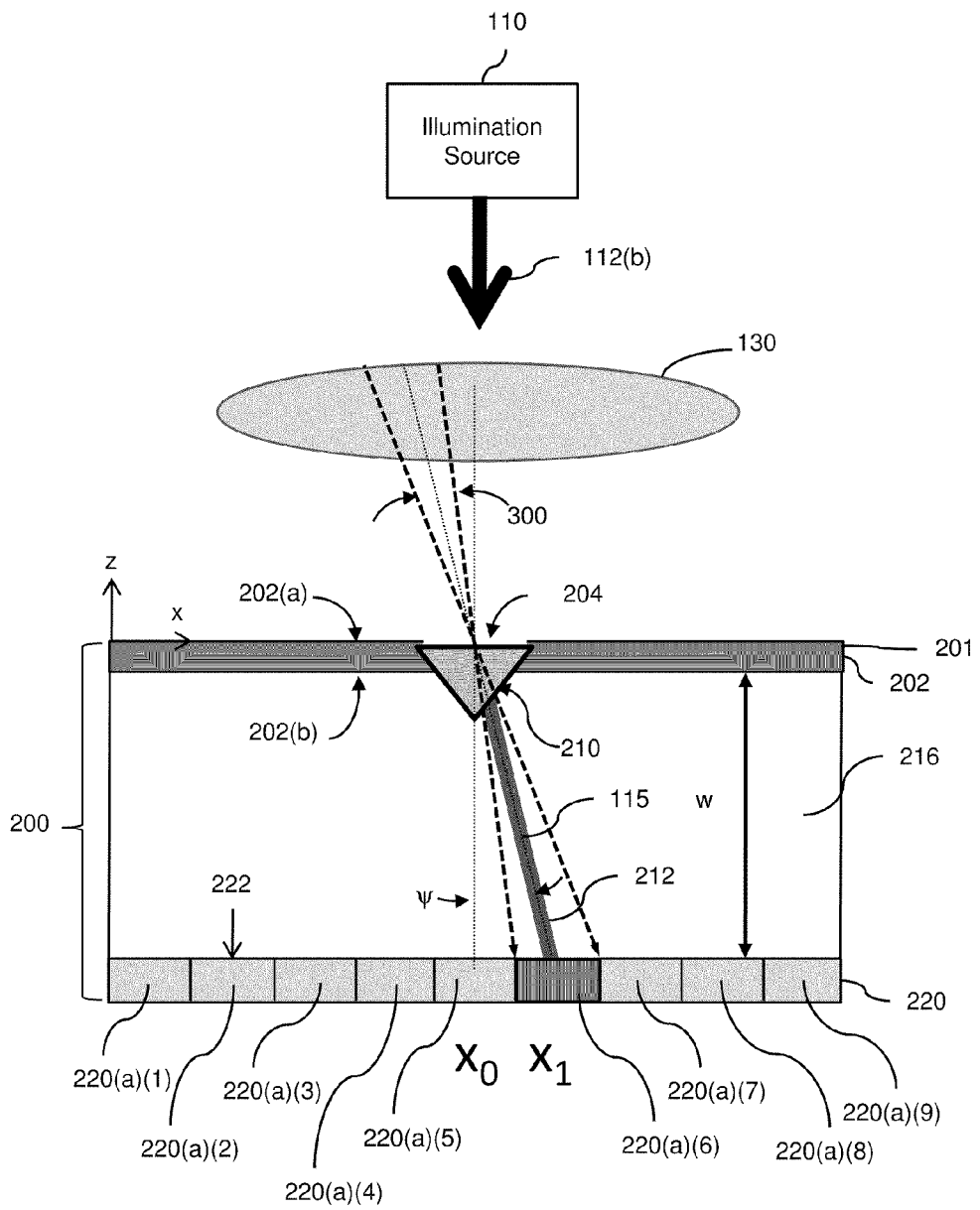

FIGS. 8 and 9 are schematic drawings of a cross-sectional view of components of an NBD 10 for three-dimensional imaging an object 130 based on perspective projections, according to embodiments of the invention. In FIGS. 8 and 9, the NBD 10 includes an illumination source 110 providing uniform illumination 112(b) and an NBDM 200.

The NBD 10 includes a multi-layer body 201 having a surface layer 202 (e.g., thin metallic layer), a light detector layer 203 having a light detector 220, and a separation layer 216 (e.g., transparent layer) between the light detector layer 203 and the surface layer 202. The surface layer 202 includes a first surface 202(a), a second surface 202(b), a light transmissive region 204, and a microaxicon 210 fitted in the light transmissive region 204. The separation layer 216 may have any suitable thickness, w. In some cases, the thickness of the separation layer 216 may be designed to maximize the efficiency of the NBD 10.

The multi-layer body 201 inexpensively using standard semiconductor and micro/nanofabrication procedures. During an exemplary assembly of the multi-layer body 201, the separation layer 216 can be placed on top of the light detector 220. Then, the surface layer 202 with the light transmissive region 204 fitted with the microaxicon 210 can be placed on top of the separation layer 216.

Although the body 201 in FIGS. 8 and 9 has certain layers, other embodiments may integrate, omit, or add one or more layers or change the location of one or more layers in the body 201. In a fluorescence embodiment, a body 201 may include an additional filter layer 214 (shown in FIG. 6) within the separation layer 216. In another example, a body 201 may include a transparent protective layer outside the first surface 202(a) to isolate the surface layer 202. In another example, the body 201 omits the separation layer 216.

The light transmissive region 204 may be of any suitable size (e.g., 0.1 μm, 0.5 μm, 1 μm, 5 μm etc.) and have any suitable cross sectional shape (e.g., circular, rectangular, oval, etc.). In many cases, the light transmissive region 204 is a hole or a slit. In some of these cases, the holes/slits may be at least partially filled with a transparent material.

The microaxicon 210 is located in the light transmissive region 204 in the surface layer 202 to receive light passing through the light transmissive region 204. The microaxicon 210 can generate one or more detection nondiffracting beams 212 associated with different viewing angles. Each detection nondiffracting beams 212 propagates at a specific projection angle, ψ. Each light detecting element corresponds to a given projection angle, ψ. In FIG. 8, the microaxicon 210 receives light altered by the object 130 over a narrow viewing angle and converts the light received into a single detection nondiffracting beam 212 at a projection angle, ψ=0. In FIG. 9, the microaxicon 210 receives light altered by the object 130 over a narrow viewing angle and converts the light received into a single detection nondiffracting beam 212 at a projection angle, ψ.

The light detector 220 includes nine light detecting elements 220(a)(1), 220(a)(2), 220(a)(3), 220(a)(4), 220(a)(5), 220(a)(6), 220(a)(7), 220(a)(8), and 220(a)(9) arranged in the X-direction. Each light detecting element 220(a) may be of any suitable size (e.g., 1-10 microns) and any suitable shape (e.g., circular or square). Although a one dimensional array of nine light detecting elements is shown, the light detector 220 may include any suitable number of light detecting elements 220(a) in any suitable form (e.g., two-dimensional array), and in any suitable orientation(s) in other embodiments. Each light detecting element 220(a) can generate a signal with the light data associated with the detection nondiffracting beam 212 received by it.

Each light detecting element 220(a) in the light detector 220 measures light that can be used to generate a perspective projection at a particular projection angle, ψ. As a group, the light detecting elements 220(a) of each NBDM 200 measure the perspective projections from different projection angles. The projection angle, ψ, refers to the angle formed between the beam axis 115 of the detection nondiffracting beam 212 and a z-directional axis through the center of the light transmissive region 204. The beam axis 115 can be approximated from the location of the center of the light detecting element 220(a) receiving the detection nondiffracting beam 212 and the center of the light transmissive region 204 at the first surface 202(a) of the surface layer 202.

The NBDM 200 comprises the surface layer 202, the separation layer 216, and the light detector layer 201 of the body 201. The NBDM 200 combines, using tomography algorithms, the measured perspective projections at different projection angles to generate three-dimensional image data and three-dimensional images of the object 130. In FIG. 8, the light detecting element 220(a) ($X_0$) measures the perspective projection at a 0 degree projection angle. In FIG. 9, the light detecting element 220(a) ($X_1$) measures the perspective projection at projection angle, $ψ_z$, measured from the z-axis in the XZ plane.

The light data may include, for example, information about the properties of the light detected such as the intensity (brightness) of the light, the wavelength(s) of the light, the frequency or frequencies of the light, the polarization(s) of the light, the phase(s) of the light, the spin angular momentum(s) of the light, and/or other light properties associated with the one or more nondiffracting beams 212 detected by the light detecting elements 220(a). Light data may also include the X location and Y location of the light detecting elements 220(a) receiving the one or more nondiffracting beams 212 and the time that the light was detected by the light detecting elements 220(a). Light data may be data based on a single time, based on multiple times, or based on a time varying basis. Light data from a light detecting element 220(a) may include the three-dimensional position of the point of detection 250 of the detection nondiffracting beam 212 detected by the light detector 220. In some cases, the three-dimensional position of the point of detection 250 may be estimated as the center or other specific location of the light detecting element 220(a) receiving detection nondiffracting beam 212 at the light detecting plane 222.

The NBDM 200 can generate three-dimensional image data based on the light data and can use the three-dimensional image data to generate three-dimensional images. Some suitable three-dimensional data includes the perspective projections and associated projection angles.

Although not shown, the NBD 10 also includes a processor 230 (shown in FIG. 1) communicatively coupled to the light detector 220 and a CRM 240 communicatively coupled to the processor 230. The processor 230 executes code stored on the CRM 240 to perform some of the functions of NBD 10. For example, the processor 230 can receive a signal with the light data from the light detector 220 and generate three-dimensional image data of the object 130 based on the light data. The processor 230 may also generate one or more three-dimensional images of the object 130 or a portion of the object 130 based on three-dimensional image data.

The NBD 10 also includes an x-axis, a y-axis (not shown), and a z-axis. The x-axis and y-axis lie in the plane of a first surface 202(a). The z-axis is orthogonal to this plane.

In operation, the illumination source(s) 110 provides uniform illumination 112(b) across the object 130. The object 130 alters (e.g., scatters and/or absorbs and re-emits) light from the uniform illumination 112(b). The microaxicon 210 receives light through the light transmissive region 204 from different projection angles. The microaxicon 210 converts the light from the different projection angles into different nondiffracting beams 212 propagating at the projection angles. In some cases, the microaxicon 210 converts the light from predefined projection angles to direct the detection nondiffracting beams 212 at the predefined projection to different light detecting elements 220(a). Each of the light detecting elements 220(a) receives a detection nondiffracting beam 212 and generates a signal with light data (e.g., intensity reading). The processor 230 receives the signal with light data and uses the light data to generate the perspective projections at the different projection angles. The processor uses tomography algorithms to combine the perspective projections at the different projection angles to generate three-dimensional data and/or a three-dimensional image of the object 130.

The transverse (X,Y) resolution of the NBD 10 can be limited by the size of the light transmissive region 204 (e.g., aperture) of the NBDM 200 in some cases. The axial resolution (Z) of the NBD 10 can be dictated by the number of perspective projections and range of projection angles used in three-dimensional tomography reconstruction algorithm in some cases.

Any suitable tomographic reconstruction algorithms can be used by the processor 230 (shown in FIG. 1) to generate the three-dimensional images from the perspective projections and projection angles. Some examples of tomographic reconstruction algorithms include filtered back-projection and iterative reconstruction.

1) Optofluidic Application

Figure 10:
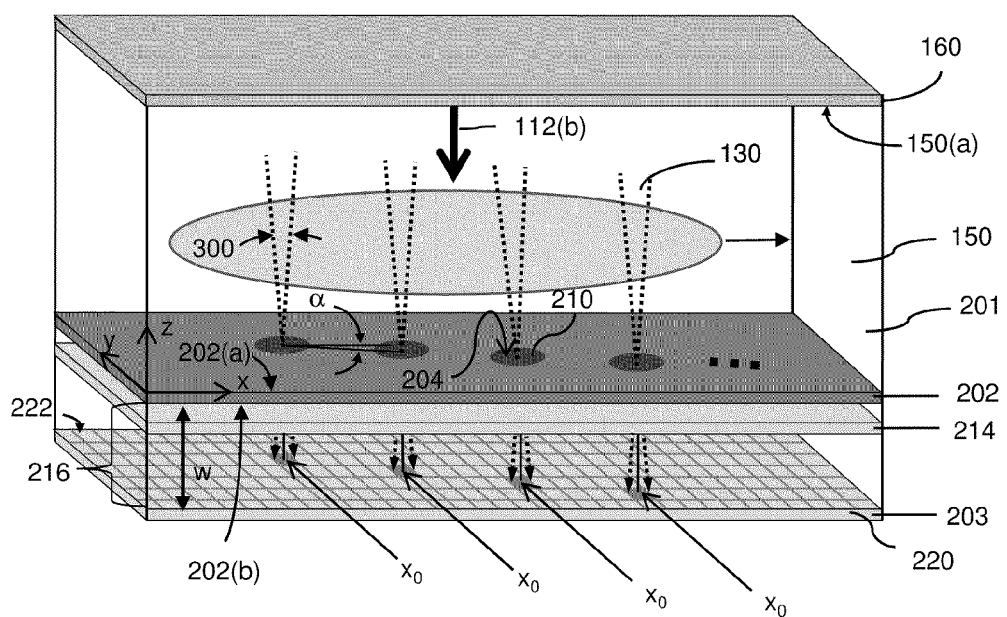
FIGS. 10 and 11 are schematic drawings of components of an NBD using optofluidic flow and takes the perspective projections approach, according an embodiment of the invention.
Figure 11:
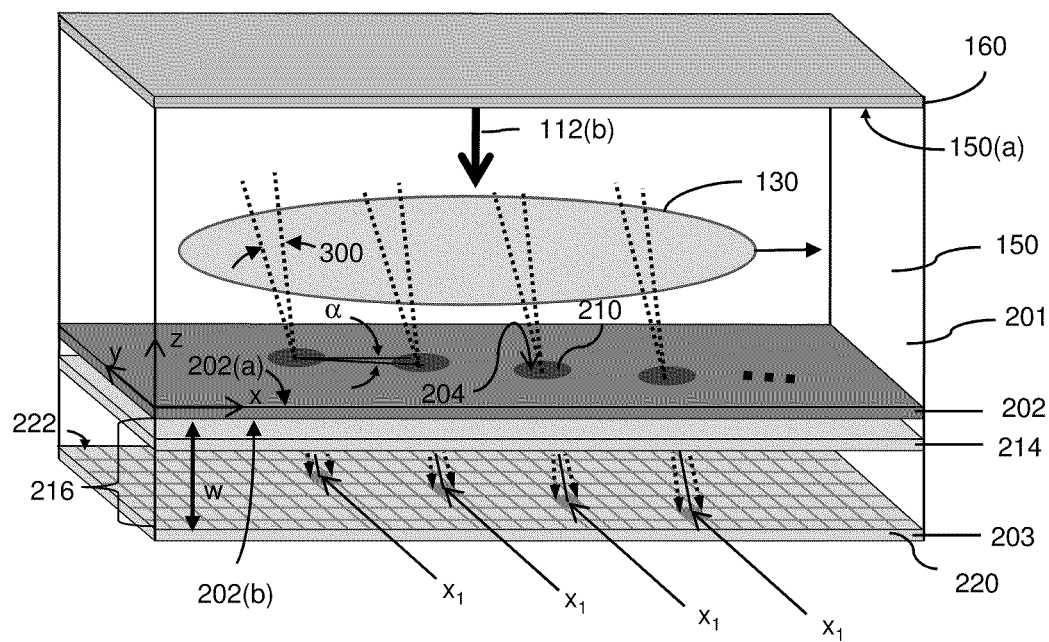

FIGS. 10 and 11 are schematic drawings of components of an NBD 10 using optofluidic flow and takes the perspective projections approach to three-dimensional imaging an object 130, according to an embodiment of the invention. The NBD 10 includes an array of NBDMs 200 and an array of illumination modules 100 (not shown) providing uniform illumination 112(b). Each of the modules in the arrays is comprised of an x-directional strip having a strip width in the y-direction and a strip length in the y-direction. In some cases, the strip width may be equal to the distance between the light transmissive regions 204 in the y-direction. The strip length may be equal to the length of the NBD 10 in the x-direction. The strips may overlap in the y-direction in some cases. Any suitable number of modules may be used in the array. The NBD 10 also includes an x-axis, a y-axis, and a z-axis.

Each NBDM 200 measures several perspective projections of the object 130, as the object 130 moves through the fluid channel 150. The array of NBDMs 100 has the ability to measure perspective projections from various projection angles and having extended depth of field within a single pass of the object 130 over the array of light transmissive regions 204. The NBD 10 can use tomography reconstruction algorithms to estimate a three-dimensional image of the object 130 based on the perspective projections measured.

The NBD 10 includes a multi-layer body 201 having a channel layer 160 having a first channel surface 150(a), surface layer 202 (e.g., thin metallic layer) having a first surface 202(a), a second surface 202(b), an optional filter layer 214, a light detector layer 203 having a light detector 220, and a separation layer 216 (e.g., transparent layer) between the light detector layer 203 and the surface layer 202. The layers of a multi-layer body 201 may be of any suitable material or combination of materials having any suitable thickness or thicknesses. The layers of the multi-layer body 201 may also include any suitable device (e.g., light detector 220). The separation layer 216 may have any suitable thickness, w. In some cases, the thickness of the separation layer 216 may be designed to maximize the collection efficiency of the NBD 10. In FIGS. 10 and 11, the x-axis and y-axis lie in the plane of the first surface 202(a) of the surface layer 202. The z-axis is orthogonal to this plane.

The separation layer 216 may optionally include a filter layer 214, which can be used in fluorescence imaging. The filter layer 214 may include any suitable device(s) (e.g., optical filters) capable of selectively transmitting light having select light properties (e.g., polarization, wavelength, frequency, intensity, phase, spin angular momentum, etc.) while substantially removing light the remaining light by any suitable method such as reflection, absorption or interference. Some examples of suitable devices include filters (e.g., interference filters, absorption filters, etc.). Any type of filter can be used such as dichroic filters, monochromatic filters, etc. In one embodiment, a polarization filter may be used. In the illustrated embodiment, the optional filter layer 214 can be used in fluorescence and phosphorescence applications, to transmit emissions from fluorophores in the object 130 and substantially removes excitation light.

Although the body 201 in FIGS. 10 and 11 has certain layers, other embodiments may integrate, omit, or add one or more layers or change the location of one or more layers in the body 201. For example, a body 201 may include a transparent protective layer outside the first surface 202(a) to isolate the surface layer 202. In another example, the body 201 omits the separation layer 216.

The body 201 also defines or includes a fluid channel 150 which has a first channel surface 150(a) and an opposing second channel surface which coincides with the first surface 202(a) of the surface layer 202. The fluid channel 150 also has a longitudinal axis, a first lateral side, and a second lateral side. The fluid channel 150 may have any suitable dimensions. For example, the width and/or height of the fluid channel 150 may each be less than about 10 microns, 5 microns, or 1 micron. In some cases, the fluid channel 150 may be sized based on the size of the objects 130 being imaged by the NBD 10. The fluid channel 150 may also include a fluid flow that can carry the specimen with one or more objects 130 in the general direction of the longitudinal axis. During fabrication, the holographic element 170 may be placed directly on top of the fluid channel 150 in some embodiments.

The surface layer 202 of the body 201 includes an array of light transmissive regions 204. Each light transmissive region 204 is fitted with a microaxicon 210. Each light transmissive region 204 may be of any suitable size and cross-sectional shape. Each light transmissive region 204 may be a hole or a slit. In some cases, the hole/slit may be partially filled with a transparent material.

The surface layer 202 also includes an array of microaxicons 210 corresponding to the array of light transmissive regions 204. Each microaxicon 210 is located in the light transmissive region 204 in the surface layer 202 to receive light passing through the corresponding light transmissive region 204. Each microaxicon 210 generates a detection nondiffracting beam 212 for each viewing angle. The microaxicon 210 can generate one or more detection nondiffracting beams 212 associated with different viewing angles 300. Each detection nondiffracting beams 212 propagates at a specific projection angle, $\psi$. In FIG. 10, the microaxicon 210 receives light altered by the object 130 over a narrow viewing angle and converts the light received into a single detection nondiffracting beam 212 at a projection angle, $\psi=0$. In FIG. 11, the microaxicon 210 receives light altered by the object 130 over a narrow viewing angle and converts the light received into a single detection nondiffracting beam 212 at a projection angle, $\psi$.

The arrays of light transmissive regions 204 and microaxicons 210 are oriented at the array angle, cc. Each array extends across or extends substantially across from the first lateral side to the second lateral side of the fluid channel 150 or alternatively extends across an examining portion of the fluid channel 150 where the object 130 being examined moves through.

The layers of the body 201 may include any suitable material or combination of materials having any suitable thickness, and may include any suitable devices (e.g., light detector 220). For example, the surface layer 202 may be made of Polydimethylsiloxane (PDMS). Although FIG. 6 has certain layers, other embodiments may integrate, omit, or add one or more layers or change the location of one or more layers in the body 201. For example, the body 210 may include a transparent protective layer outside the first surface 202(a) to isolate the surface layer 202. Although the body 201 in FIGS. 10 and 11 has certain layers, other embodiments may integrate, omit, or add one or more layers or change the location of one or more layers in the body 201. In another example, a body 201 may include a transparent protective layer outside the first surface 202(a) to isolate the surface layer 202. In another example, the body 201 omits the separation layer 216.

The multi-layer body 201 may be fabricated inexpensively using standard semiconductor and micro/nanofabrication procedures. During an exemplary assembly of the multi-layer body 201, the separation layer 216 can be placed on top of the light detector 220. Then, the surface layer 202 with the light transmissive region 204 fitted with the microaxicon 210 can be placed on top of the separation layer 216.

As a group, the array of illumination modules 100 includes an illumination source 110 coupled to a scanning mechanism 120. The scanning mechanism 120 includes the fluid channel 150 which can have a fluid flow for moving the object 130 across the array of light transmissive regions 204. The illumination source 110 includes any suitable source of uniform illumination 112(b).

As a group, the array of NBDMs 200 includes the surface layer 202, the light detector layer 203 having the light detector 220 with a detecting plane 222, the separation layer 216 between the light detecting plane 222 and the second surface 202(b) of the surface layer 202.

The NBDM 200 comprises the surface layer 202, the separation layer 216, and the light detector layer 201 of the body 201. The arrays of NBDMs 200 combine, using tomographic algorithms, the measured perspective projections at different projection angles to generate three-dimensional image data and three-dimensional images of the object 130. In FIG. 8, the light detecting element 220(a) ($X_0$) measures the perspective projection at a 0 degree projection angle. In FIG. 9, the light detecting element 220(a) ($X_1$) measures the perspective projection at projection angle, $\psi_z$, measured from the z-axis in the XZ plane.

The light detector 220 includes a two-dimensional array of discrete light detecting elements 220(a). Although a two-dimensional array of light detecting elements 220(a) is shown, other suitable arrangements (e.g., one-dimensional array or a multiplicity of one-dimensional and two-dimensional arrays) can be used. The arrays can be in any suitable orientation or combination of orientations. Each light detecting element 220(a) may be of any suitable size (e.g., 1-10 microns) and any suitable shape (e.g., circular or square).

Each light detecting element 220(a) in the light detector 220 measures light from a detection nondiffracting beam 212 associated with a narrow viewing angle and a projection angle. The measured light from each light detecting element 220(a) can be used to generate a perspective projection associated with the narrow viewing angle and a projection angle. In FIG. 10, each light detecting element 220(a) at point $X_0$ of each NBDM 200 measures a perspective projection at a 0 degree projection angle. In FIG. 11, the light detecting element 220(a) at point $X_1$ of each NBDM 200 measures the perspective projection at projection angle, $\psi$.

Each light detecting element 220(a) can generate a signal with time varying light data associated with the light received, as the object 130 moves through the fluid channel 150. The time varying light data can be used to a generate perspective projection at an associated projection angle, $\psi$. As a group, the light detecting elements 220(a) of each NBDM 200 measure the perspective projections from different projection angles, as the object 130 moves through the fluid channel 150.

The time varying light data may include, for example, information about the properties of the light detected such as the intensity of the light, the wavelength(s) of the light, the frequency or frequencies of the light, the polarization(s) of the light, the phase(s) of the light, the spin angular momentum(s) of the light, and/or other light properties associated with the one or more nondiffracting beams 212 detected by the light detecting elements 220(a), at the time of detection. Time varying light data may also include the location of the light detecting elements 220(a) receiving the one or more nondiffracting beams 212 and the time that the light was detected by the light detecting elements 220(a). Time varying light from a light detecting element 220(a) may include the three-dimensional position of the point of detection 250 of the detection nondiffracting beam 212 detected by the light detector 220. In some cases, the three-dimensional position of the point of detection 250 may be estimated as the center or other specific location of the light detecting element 220(a) receiving detection nondiffracting beam 212 at the light detecting plane 222. Time varying light data may include data in any suitable form such as a line scan.

In the perspective projection approach, each light detecting element 220(a) is associated with a detection nondiffracting beam 212 that propagates along a projection angle, $\psi$, which is the center of its associated view cone. The projection angle, $\psi$, can be approximated as the angle formed between the beam axis 115 of the detection nondiffracting beam 212 and a z-directional axis through the center of the microaxicon 210. The beam axis 115 can be approximated from the location of the center of the light detecting element 220(a) receiving the detection nondiffracting beam 212 and the center of the light transmissive region 204 at the first surface 202(a) of the surface layer 202.

The NBDM 200 can generate three-dimensional image data based on the light data and can use the three-dimensional image data to generate three-dimensional images. Some suitable three-dimensional data includes the perspective projections and associated projection angles.

Although not shown in FIGS. 10 and 11, the NBD 10 also includes a processor 230 communicatively coupled to the light detector 220 and a CRM 240 communicatively coupled to the processor 230. The processor 230 executes code stored on the CRM 240 to perform some of the functions of NBD 10. For example, the processor 230 can receive a signal with the light data from the light detector 220 and generate three-dimensional image data of the object 130 based on the light data. The processor 230 may also generate one or more three-dimensional images of the object 130 or a portion of the object 130 based on three-dimensional image data.

In operation, the illumination source 110 provides uniform illumination 112(b). When an object 130 is present in the fluid channel 150, the object is illuminated. The object 130 alters light. The array of microaxicons 210 receives light through the corresponding array of light transmissive regions 204, as the object moves through the fluid channel 150. The microaxicon 210 converts the light received into separate detection nondiffracting beams 212 associated with various viewing angles. The detection nondiffracting beams 212 propagate at different projection angles to different light detecting elements 220(a). The light detecting elements receive the detection nondiffracting beams 212 and generate a signal with time varying light data associated with the received light. The processor 230 uses the time varying light data associated with each light detecting element 220(a) to generate a perspective projection and determine an associated projection angle, at each time of detection. The processor 230 uses a tomography reconstruction algorithm to generate a three-dimensional image of the object 130 using the perspective projections at various projection angles and associated viewing angles.

Any suitable tomographic reconstruction algorithms can be used by the processor 230 (shown in FIG. 1) to generate the three-dimensional images from the perspective projections and projection angles. Suitable tomography reconstruction algorithms are commercially available. Some examples of tomographic reconstruction algorithms include filtered back-projection and iterative reconstruction.

III. Subsystems

Figure 12:
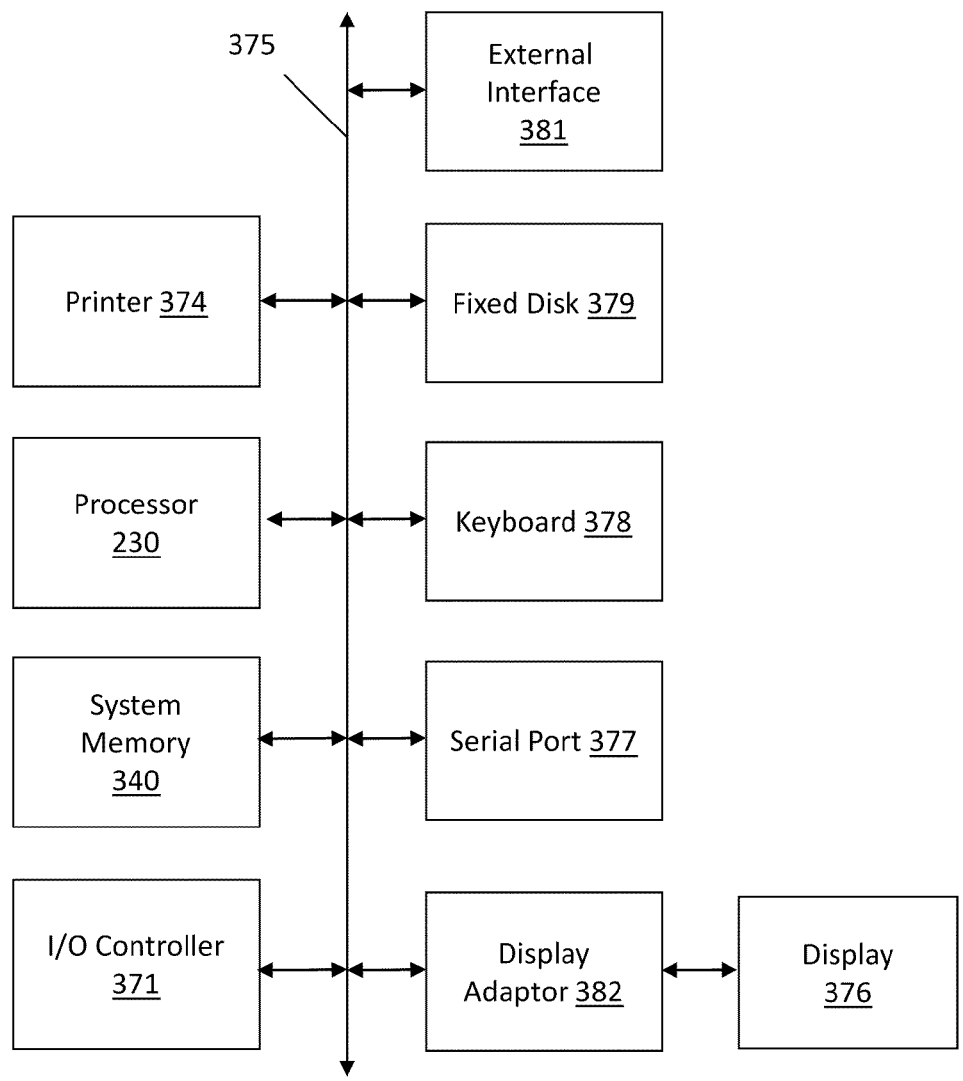
FIG. 12 shows a block diagram of subsystems that may be present in a nondiffracting beam detecting device for three-dimensional imaging, according to embodiments of the invention.

FIG. 12 shows a block diagram of subsystems that may be present in the NBD 10, according to embodiments of the invention. For example, the NBD 10 includes a processor 230 for processing light data and for generating three-dimensional image data and/or three-dimensional images of the object 130. The processor 230 may be a component of the light detector 220, in some cases. In other embodiments, the NBD 10 may be in communication with a computer having one or more of the subsystems in FIG. 12.

The various components previously described in the Figures may operate using one or more of the subsystems to facilitate the functions described herein. Any of the components in the Figures may use any suitable number of subsystems to facilitate the functions described herein. Examples of such subsystems and/or components are shown in a FIG. 12. The subsystems shown in FIG. 12 are interconnected via a system bus 375. Additional subsystems such as a printer 374, keyboard 378, fixed disk 379 (or other memory comprising computer readable media), display 376, which is coupled to display adapter 382, and others are shown. Peripherals and input/output (I/O) devices, which couple to I/O controller 371, can be connected to the computer system by any number of means known in the art, such as serial port 377. For example, serial port 377 or external interface 381 can be used to connect the computer apparatus to a wide area network such as the Internet, a mouse input device, or a scanner. The interconnection via system bus allows the processor 230 to communicate with each subsystem and to control the execution of instructions from system memory 340 or the fixed disk 379, as well as the exchange of information between subsystems. The system memory 340 and/or the fixed disk 379 may embody a computer readable medium 240. Any of these elements may be present in the previously described features. A computer readable medium 240 according to an embodiment of the invention may comprise code for performing any of the functions described above.

In some embodiments, an output device such as the printer 384 or display 376 of the NBD 10 can output various forms of data. For example, the NBD 10 can output a bright-field image and/or a fluorescence image of an object 130 or other results of analysis.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

All patents, patent applications, publications, and descriptions mentioned above are hereby incorporated by reference in their entirety for all purposes. None is admitted to be prior art.

What is claimed is:

1. A nondiffracting beam detection module for generating three-dimensional image data, comprising:
    a surface layer having a first surface and a light transmissive region;
    a microaxicon configured to receive light altered by an object located outside the first surface and configured to generate one or more detection nondiffracting beams based on the received light, wherein each detection nondiffracting beam is at a propagation angle associated with an angle of incidence of the received light; and
    a light detector configured to receive the one or more detection nondiffracting beams and generate three-dimensional image data associated with the object based on the one or more detection nondiffracting beams received, wherein the three-dimensional image data is determined based on a position of each of the one or more nondiffracting beams at the light detector, wherein the position is associated with the propagation angle.

2. The nondiffracting beam detection module for generating three-dimensional image data of claim 1, further comprising a processor configured to generate a three-dimensional image of a portion of the object based on the three-dimensional image data.

3. The nondiffracting beam detection module for generating three-dimensional image data of claim 1, wherein the light detector is further configured to localize a three-dimensional position on the object associated with each detection nondiffracting beam received.

4. The nondiffracting beam detection module for generating three-dimensional image data of claim 1, wherein the light detector includes light detecting elements, each light detecting element associated with a different height on the object.

5. The nondiffracting beam detection module for generating three-dimensional image data of claim 1, wherein the light detector is further configured to determine perspective projections based on the detection nondiffracting beams received, the light detector further configured to generate the three-dimensional image data, using tomography, based on the determined perspective projections.

6. The non nondiffracting beam detection module for generating three-dimensional image data of claim 1, further comprising a separation layer between the light detector and the surface layer.

7. The nondiffracting beam detection module for generating three-dimensional image data of claim 1, further comprising a filter located between the light detector and surface layer, the filter configured to pass emission light.

8. The nondiffracting beam detection module for generating three-dimensional image data of claim 1, wherein the light transmissive region is an aperture.

9. A nondiffracting beam detection device for three-dimensional imaging, comprising:
    a nondiffracting beam detection module comprising:
        a surface layer having a first surface, a second opposing surface, and a light transmissive region;
        a microaxicon in the light transmissive region, the microaxicon configured to receive light altered by an object located outside the first surface through the light transmissive region and configured to generate one or more detection nondiffracting beams based on the received light, wherein each of the one or more detection nondiffracting beams is at a propagation angle associated with an angle of incidence of the received light; and a light detector configured to receive the one or more detection nondiffracting beams and generate three-dimensional image data associated with the object based on the one or more detection nondiffracting beams received, wherein the three-dimensional image data is determined based on a position of each of the one or more nondiffracting beams at the light detector, wherein the position is associated with the propagation angle; and a processor in communication with the light detector to receive the three-dimensional image data, and configured to generate a three-dimensional image of a portion of the object based on the three-dimensional image data received.

10. The nondiffracting beam detection device of claim 9, further comprising an illumination source for generating an illuminating nondiffracting beam through the object, wherein the light detector is further configured to localize a three-dimensional position of one or more point sources on the object, associated with the one or more detection nondiffracting beams received, and wherein the processor generates the three-dimensional image using the three-dimensional position of the one or more point sources.

11. The nondiffracting beam detection device of claim 9, further comprising an illumination source for generating an illuminating nondiffracting beam propagating through the object, wherein the light detector includes one or more light detecting elements, each light detecting element associated with a different height, wherein the processor generates the three-dimensional image using light data generated by each light detecting element receiving a detection nondiffracting beam and the height associated with the light detection element.

12. The nondiffracting beam detection device of claim 9, further comprising a scanner coupled to the illumination source, the scanner configured to move the illuminating nondiffracting beam through a volume of the object.

13. The nondiffracting beam detection device of claim 9, further comprising a scanner coupled to the object, the scanner configured to move the object through the illuminating nondiffracting beam.

14. The nondiffracting beam detection device of claim 9, further comprising an illumination source providing uniform illumination outside the first surface, wherein the light detector is further configured to determine one or more perspective projections having different viewing angles, and wherein the processor is further configured to estimate, using tomography, the three-dimensional image of the object from the one or more determined perspective projections.

15. The nondiffracting beam detection device of claim 9, further comprising a separation layer between the light detector and the surface layer.

16. The nondiffracting beam detection device of claim 9, further comprising a filter located between the light detector and surface layer, the filter configured to pass emission light.

17. The nondiffracting beam detection device of claim 9, wherein the light detector includes the processor.

18. A nondiffracting beam detection device for three-dimensional imaging, comprising:

a body having a surface layer having a first surface;

a plurality of nondiffracting beam detection modules, each nondiffracting beam detection module comprising:

a light transmissive region in the surface layer;

a microaxicon in the light transmissive region, the microaxicon configured to receive light altered by an object located outside the first surface through the light transmissive region and configured to generate one or more detection nondiffracting beams based on the received light, wherein each of the one or more detection nondiffracting beams is at a propagation angle associated with an angle of incidence of the received light; and a light detector configured to receive the one or more detection nondiffracting beams and generate three-dimensional image data associated with the object based on the one or more detection nondiffracting beams received, wherein the three-dimensional image data is determined based on a position of each of the one or more nondiffracting beams detected at the light detector, wherein the position is associated with the propagation angle; and a processor configured to generate a three-dimensional image of the object based on the three-dimensional image data received from the light detectors of the plurality of nondiffracting beam detection modules.

19. The nondiffracting beam detection module of claim 1, wherein the propagation angle is at about the incidence angle.

20. The nondiffracting beam detection module of claim 1, wherein the microaxicon is located in the light transmissive region.

21. The nondiffracting beam detection module of claim 1, wherein the one or more detection nondiffracting beams are generated to the inside of the first surface.

22. The nondiffracting beam detection device for three-dimensional imaging of claim 9, wherein the propagation angle is at about the incidence angle.

23. The nondiffracting beam detection device for three-dimensional imaging of claim 9, wherein the microaxicon is located in the light transmissive region.

24. The nondiffracting beam detection device for three-dimensional imaging of claim 9, wherein the one or more detection nondiffracting beams are generated to the inside of the first surface.

25. The nondiffracting beam detection device for three-dimensional imaging of claim 18, wherein the propagation angle is at about the incidence angle.

26. The nondiffracting beam detection device for three-dimensional imaging of claim 18, wherein the microaxicon is located in the light transmissive region.

27. The nondiffracting beam detection device for three-dimensional imaging of claim 18, wherein the one or more detection nondiffracting beams are generated to the inside of the first surface.

* * * * *